(12) United States Patent
Matsumoto et al.

(10) Patent No.: US 6,418,369 B2
(45) Date of Patent: Jul. 9, 2002

(54) ROAD SURFACE FRICTION COEFFICIENT ESTIMATING APPARATUS

(75) Inventors: Shinji Matsumoto, Yokohama; Takeshi Kimura, Yokosuka; Taku Takahama, Yokosuka; Hiromitsu Toyota, Yokosuka, all of (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/736,248

(22) Filed: Dec. 15, 2000

(30) Foreign Application Priority Data

Dec. 16, 1999 (JP) .............................. 11-357457

(51) Int. Cl.$^7$ ................ B60T 7/12; G05D 1/00
(52) U.S. Cl. ................ 701/80; 701/83; 701/90; 477/40; 180/197
(58) Field of Search ................ 701/70, 71, 80, 701/83, 90, 81; 477/40, 71; 180/197

(56) References Cited

U.S. PATENT DOCUMENTS

| 5,025,879 | A | * | 6/1991 | Mitsunari | .............. | 180/400 |
| 5,508,924 | A | * | 4/1996 | Yamashita | .............. | 701/22 |
| 5,813,936 | A | * | 9/1998 | Kichima et al. | .............. | 477/97 |
| 6,015,192 | A | | 1/2000 | Fukumura | | |

FOREIGN PATENT DOCUMENTS

| JP | 5-131912 A | 5/1993 |
| JP | 10-35443 A | 2/1998 |
| JP | 11-48939 A | 2/1999 |

* cited by examiner

Primary Examiner—Gertrude Arthur
(74) Attorney, Agent, or Firm—Shinjyu Global IP Counselors, LLP

(57) ABSTRACT

A road surface friction coefficient estimating apparatus is provided for estimating a road surface friction coefficient of a vehicle that is traveling at a steady state. The road surface friction coefficient estimating apparatus basically has a driving/braking force controller, a driving force controller, a braking force controller (brake fluid pressure controller), a plurality of wheel velocity sensors, a wheel load sensor and a control unit. The driving/braking force controller sets a pre-selected force to be generated and calculates the road surface friction coefficient. The driving force controller generates a driving force in accordance with the pre-selected force. The braking force controller generates a braking force in accordance with the pre-selected force. The wheel velocity sensors produce a wheel velocity signal indicative of a wheel velocity. The wheel load detecting sensor produces a wheel load signal indicative of a wheel load. The control unit which is part of driving/braking force controller calculates a road surface friction coefficient based on the wheel load, the wheel velocity, and the braking and driving forces. The braking force is configured to cancel the driving force.

20 Claims, 11 Drawing Sheets

ROAD SURFACE FRICTION COEFFICIENT ESTIMATING APPARATUS

BACKGROUND OF THE INVENTION

1. Field of the Invention

This invention generally relates to a road surface friction coefficient estimating apparatus for a vehicle. More specifically, the present invention relates to a road surface friction coefficient estimating apparatus for use when the vehicle is traveling at a steady state, i.e., no acceleration or deceleration occurring in the vehicle.

2. Background Information

It is well known that a road surface friction coefficient is useful control information in anti-skid control systems to avoid locking the wheels during braking, and in traction control systems to prevent wheel slippage caused by driving torque exerted during acceleration. Therefore, it is desirable to accurately estimate the road surface friction coefficient of the road on which a vehicle is traveling.

Consequently, various road surface friction coefficient estimating methods have been proposed for use in the anti-skid control systems and traction control systems that are mounted on vehicles. Generally, such methods estimate the road surface friction coefficient by utilizing the change in vehicle velocity. For example, a common method used in anti-skid systems is to estimate the vehicle velocity while the anti-skid control system is operating, and then estimate the road surface friction coefficient based on the amount of change in the vehicle velocity. Such method is disclosed in Japanese Laid-Open Patent Publication No. 5-131912.

Similarly, in the case of traction control systems, vehicle velocity is estimated by detecting the wheel velocity from non-driving wheels while the traction control system is operating. Then, the road surface friction coefficient is estimated based on the amount of change in the vehicle velocity.

Meanwhile, in Japanese Laid-Open Patent Publication No. 11-48939, the applicants of the present invention have proposed an anti-skid control apparatus, in which the road surface friction coefficient is estimated using the driving torque or the braking torque on the wheels, the wheel load, and the rotational acceleration of the wheels during braking, based on the rotational motion equations of the wheels.

There has also been proposed another method of estimating the road surface friction coefficient which uses the driving torque or the braking torque on the wheels, the wheel load, and the rotational acceleration of the wheels, based on the rotational motion equations of the wheels. In this method, four points representing four wheels of the vehicle are plotted in a two-dimensional coordinates having an axis of driving/braking force per unit wheel load and an axis of wheel velocity. In this coordinate, a regression line can be drawn based on the points. The slope angle of the regression line with respect to the wheel velocity axis expresses the driving stiffness, from which the road surface friction coefficient can be estimated. This method is disclosed in Japanese Laid-Open Patent Publication No. 10-35443. Such method improves the anti-skid control performance and traction control performance.

These road surface friction coefficient estimating methods have proven to be useful in providing control information for an anti-skid control system and/or a traction control system. However, the above-mentioned road surface friction coefficient estimating methods still have room for improvement in view of the following observations.

The aforementioned road surface friction estimating methods generate driving forces or braking forces on the wheels in order to estimate the road surface friction coefficient. In other words, in the case of road surface friction coefficient estimating apparatuses used in the aforementioned anti-skid control systems and traction control systems, it is difficult to obtain an accurate estimate unless driving forces or braking forces are generated on the wheels. Estimation is particularly difficult when the vehicle is traveling in a steady state, i.e., neither accelerating nor decelerating.

Furthermore, in the aforementioned road surface friction coefficient estimating apparatuses, when driving forces or braking forces are generated on the wheels in order to estimate the road surface friction coefficient during steady-velocity travel, the resulting acceleration or deceleration of the vehicle causes awkwardness in the driving.

Also, some of such road surface friction coefficient estimating apparatuses require a sensor, such as a small wheel-shaped sensor, in addition to the regular wheels of the vehicle, such that the small wheel-shaped sensor contacts the road surface. In that case, the price of the vehicle will increase due to the cost of the sensor. Additionally, there will be a need to decide where the sensor should be mounted.

Accordingly, the existing road surface friction coefficient estimating methods and apparatuses do not have the ability to estimate the road surface friction coefficient accurately and easily while the vehicle is traveling in a steady state, without causing an awkwardness in driving due to the acceleration or deceleration of the vehicle which is caused for the purpose of estimation of the road surface friction coefficient. Additionally, the aforesaid functions of road surface friction estimation should be preferably provided in a simple manner.

This need for accurate and easy road surface friction coefficient estimation method and apparatus that function while the vehicle is traveling in a steady state is further emphasized in view of various vehicle control systems and vehicle stabilizing apparatuses which are likely to be introduced in vehicles in the near future. These vehicle control systems and vehicle stabilizing apparatuses automatically generate braking forces in a vehicle in various manners in order to avoid obstacles by using information provided by external sensors. In these systems, the distance between the vehicle and the obstacle and relative velocity are detected by the external sensors. Automatic braking is executed in order to avoid the obstacle. Particularly in these systems, it is inherently necessary to be able to operate appropriately whenever obstacle avoidance is necessary, even when the vehicle is traveling in a steady state. If the road surface friction coefficient cannot be estimated accurately, the automatic braking may not be able to generate sufficient braking force. Therefore, the road surface friction coefficient estimation is indispensable in these vehicle control systems.

In view of the above, there exists a need for a road surface friction coefficient estimating apparatus and methods which overcome the above mentioned problems in the prior art. This invention addresses this need in the prior art as well as other needs, which will become apparent to those skilled in the art from this disclosure.

SUMMARY OF THE INVENTION

An object of the present invention is to provide a road surface friction coefficient estimating apparatus that can function while the vehicle is traveling in a steady state.

Another object of the present invention is to provide a road surface friction coefficient estimating method that can function while the vehicle is traveling in a steady state.

This object is basically attained by providing a road surface friction coefficient estimating apparatus for a vehicle equipped with a plurality of wheels. The road surface friction coefficient estimating apparatus has target driving/braking force setting means, driving force generating means, braking force generating means, wheel velocity detecting means, wheel load detecting means, and road surface friction coefficient calculating means. The target driving/braking force setting means sets a pre-selected torque to be generated. The driving force generating means generates a driving force in at least one of the wheels in accordance with the pre-selected force set by the target driving/braking force setting means. The braking force generating means generates a braking force in at least one of other wheels in accordance with the pre-selected force set by the target driving/braking force setting means. The braking force has a magnitude to cancel the driving force. The wheel velocity detecting means produces a wheel velocity signal indicative of a wheel velocity. The wheel load detecting means produces a wheel load signal indicative of a wheel load. The road surface friction coefficient calculating means calculates a road surface friction coefficient based on the wheel load, the wheel velocity, and the braking and driving forces.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

First Embodiment

Figure 1:
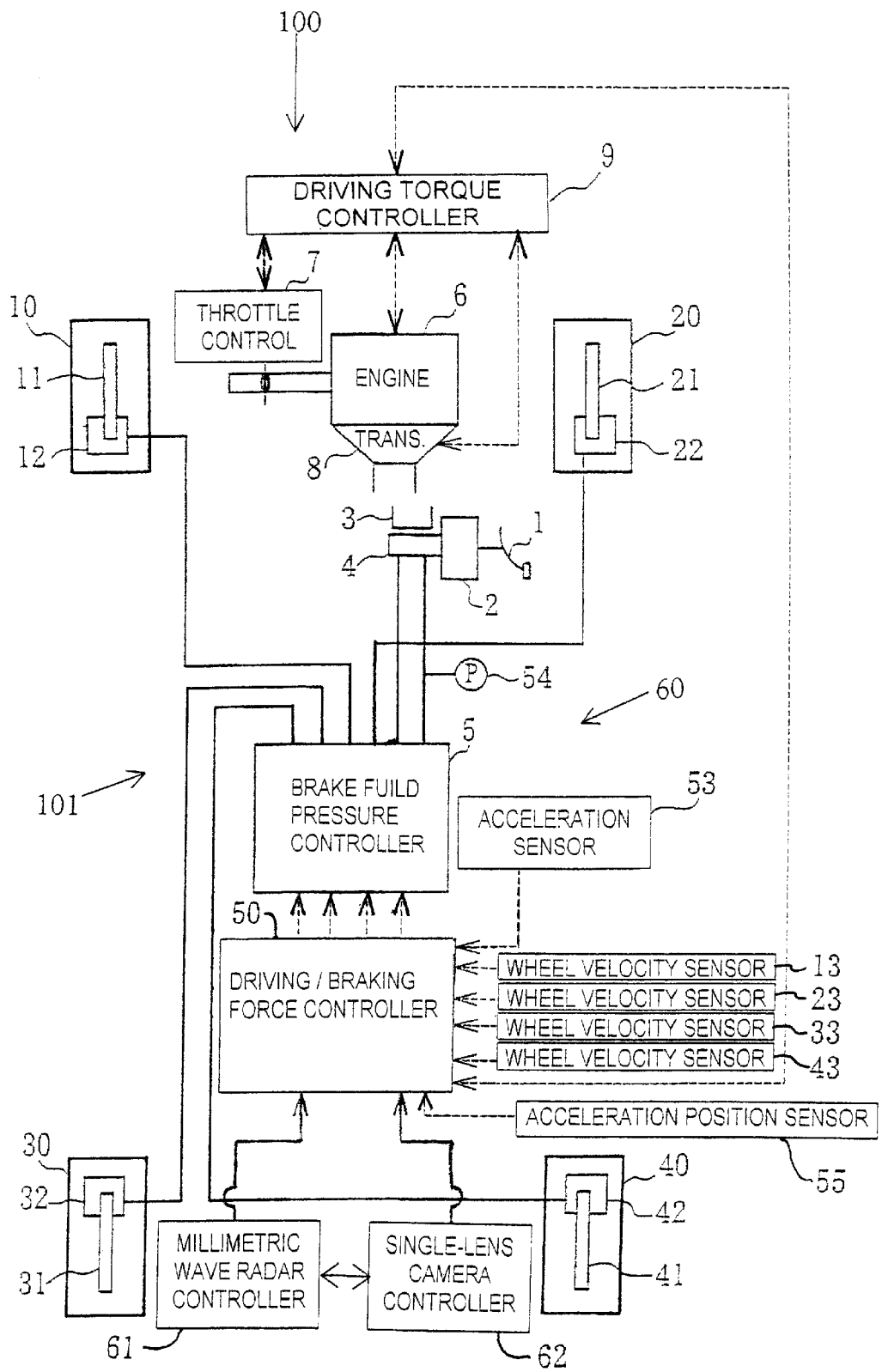
FIG. 1 is a schematic view of a road surface coefficient estimating apparatus for a vehicle in accordance with selected embodiments of the present invention.

A first embodiment of the present invention is explained below referring to FIGS. 1–13. FIG. 1 schematically shows a road surface friction coefficient estimating apparatus (hereinafter referred to as estimating apparatus) 100 installed in a rear-wheel drive vehicle or automobile 101 in accordance with the first embodiment of the present invention.

Estimating apparatus 100 is designed to estimate the road surface friction coefficient when vehicle 101 is travelling in a steady state, i.e., no acceleration and/or deceleration occurring in the vehicle 101. As explained below, the estimation of the road surface friction coefficient is accomplished by applying a driving force to the driving wheels and a counteracting braking force to the non-driving wheels when the vehicle 101 is neither accelerated nor decelerated during the estimating process of the estimating apparatus 100. Of course, it will be apparent to those skilled in the art from this disclosure that the estimating apparatus 100 can also estimate a road surface friction coefficient during deceleration and/or acceleration. Thus, the estimating apparatus 100 can be utilized for estimating road surface friction coefficient in most traveling conditions.

In this embodiment, the estimating apparatus 100 is incorporated into a driving/braking control system for vehicle 101. Vehicle 101 basically comprises a set of road wheels, a power drive system, a brake system and a suspension system, as discussed below.

The brake system of vehicle 101 is designed such that the left and right braking forces can be controlled independently by adjusting braking hydraulic pressures for both the front and rear wheels. The brake system 60 of vehicle 101 basically includes a brake pedal 1, a booster 2, a reservoir 3, a master cylinder 4, a brake fluid pressure controller or braking force controller 5, four brake disks 11, 21, 31 and 41, and four wheel cylinders 12, 22, 32 and 42. The four brake disks 11, 21, 31 and 41 and the four wheel cylinders 12, 22, 32 and 42 form four brake units for individually providing a braking force to each one of the wheels 10, 20, 30 and 40, respectively. In accordance with a driver's pedal effort on the brake pedal 1, master cylinder 4 displaces brake hydraulic fluid under pressure to brake fluid pressure controller 5. The brake fluid pressure controller 5 supplies a brake fluid pressure with or without pressure modulation to each wheel cylinder 12, 22, 32 and 42. Wheel cylinders 12, 22, 32 and 42 provide a braking force to wheels 10, 20, 30 and 40 by applying hydraulic pressure to the brake disks 11, 21, 31 and 41 from brake fluid pressure controller 5 to frictionally clamp brake disks 11, 21, 31 and 41. Thus, brake fluid pressure controller 5 generates braking force by generating a desired braking force on wheels 10, 20, 30 and 40.

More specifically, brake fluid pressure controller 5 is operatively coupled to each of pressure supply systems or channels that are each connected to brake units of wheels 10, 20, 30 and 40. Brake fluid pressure controller 5 includes an actuator (not shown in figures) in each of the left, right, front, and rear pressure supply systems. Preferably, proportional solenoid valves are used as the actuators so that the wheel cylinder hydraulic pressure Pw can be controlled to any desired braking hydraulic pressure. In this manner, each wheel 10, 20, 30 or 40 can be braked individually when the wheel cylinder of each brake unit 12, 22, 32 or 42 is supplied with hydraulic pressure from brake fluid pressure controller 5. Actuators and this function of controlling the brake units by pressure are well known in the art. Therefore, the structure and function of actuators and brake units will not be explained in further detail herein.

Brake fluid pressure controller 5 functions as braking force generating means by adjusting the hydraulic pressure delivered from master cylinder 4 in accordance with an input signal from driving/braking force controller 50. Brake fluid pressure controller 5 then controls the braking hydraulic pressure supplied to the wheel cylinders 12, 22, 32 and 42 of wheels 10, 20, 30 and 40.

The power system of vehicle 101 basically includes at least an engine 6, a throttle controller 7, an automatic transmission 8 with a conventional differential gear device, and a driving torque controller or driving force controller 9. Power from the engine 6 is transmitted through the transmission 8 and the conventional differential gear device to the rear wheels 30 and 40 which are the driving wheels, and indirectly to the front wheels 10 and 20 which are non-driving wheels on a non-powered axle.

As shown in FIG. 1, estimating apparatus 100 basically includes a driving/braking force controller or control unit 50, a driving torque controller 9 and brake system 60. Thus, estimating apparatus 100 is operatively coupled to engine 6, throttle controller 7, and transmission 8 to apply driving forces to left and right rear wheels 30 and 40. The estimating apparatus 100 is also operatively coupled to brake system 60 of vehicle 101 to apply braking forces to left and right front wheels 10 and 20.

An engine speed sensor or engine revolution sensor senses the engine speed Ne in terms of the number of revolutions per unit time. A throttle position sensor senses an engine throttle opening (degree) TVO. An engine controller controls the engine 6 in accordance with engine and vehicle operating condition sensed by a group of sensors including the engine speed sensor and the throttle position sensor.

Vehicle 101 of this embodiment further includes a transmission controller for controlling the automatic transmission in accordance with various input information items. Since engines and transmissions are well known in the art, the structure and function of the engine 6 and the transmission 8 would be obvious to one of ordinary skill in the art without further explanation herein.

The driving/braking force controller 50 controls individual brake pressures of the wheel cylinders 12, 22, 32 and 42 by controlling the brake fluid pressure controller 5. In addition, the driving/braking force controller 50 estimates unknown vehicle operating variables such as vehicle body speed Vx and a road surface friction coefficient $\mu$ for a wheel slip brake control or anti-skid brake control. In this example, the driving/braking force controller 50 serves as an estimating unit or estimating means for estimating various forces and/or operating conditions. Brake fluid pressure sensors sense the respective brake fluid pressures applied to the wheel cylinders. In this preferred embodiment, the brake fluid pressure sensors serve as brake sensors for sensing individual braking conditions on the wheels 10, 20, 30 and 40.

The estimating apparatus 100 computes the individual vertical wheel loads of the vehicle wheels 10, 20, 30 and 40 by any known system. Preferably, the wheel loads are based on reading lateral and longitudinal accelerations. The driving/braking force controller 50 reads the sensed lateral acceleration and the sensed longitudinal acceleration from conventional sensors such as acceleration sensor 53. The values of the lateral and longitudinal accelerations are then put through a filtering operation for determining filtered lateral and longitudinal accelerations, which take into consideration a delay in load transfer due to suspension strokes. The filtered lateral and longitudinal accelerations are then used to calculate load variations in the wheels 10, 20, 30 and 40 based on various vehicle constants such as the wheel base, height of the center of gravity, tread and roll stiffness distribution of the vehicle 101. From these values, individual wheel loads for the four wheels 10, 20, 30 and 40 can be calculated utilizing initial wheel loads preliminarily stored in a memory section of driving/braking force controller 50. The acceleration sensor 53 is thus utilized as wheel load detecting means for producing a wheel load signal that can be utilized by driving/braking force controller 50 to calculate individual wheel loads. In other words, the acceleration sensor 53 produces a wheel load signal indicative of a wheel load, since the precise structure of the sensors and the calculating algorithms are not critical to the present invention. Moreover, the sensing and calculation of individual wheel loads for vehicles are known in the art. Therefore, the precise structure and algorithms for determining individual wheel load will not be discussed or illustrated in detail herein. In other words, the wheel load detecting means can be any structure and/or algorithm that can be utilized to carry out the present invention. Therefore, "means plus function" clauses as utilized in the specification and disclosure should include any structure and/or algorithm that can be utilized to carry out the function of the means plus function clause.

Driving/braking force controller 50 functions as target driving/braking force setting means and road surface friction coefficient calculating means. Driving/braking force controller 50 acts as a vehicle control unit that includes a microcomputer, an input detection circuit for receiving various signals, a processor circuit (Central Processing Unit or CPU), a memory circuit, and an output circuit that outputs signals to brake fluid pressure controller 5 and driving torque controller 9. The memory circuit stores processing results and control programs such as ones for road surface friction coefficient estimation and obstacle avoidance control, which are run by the processor circuit. It will be apparent to those skilled in the art from this disclosure that the precise structure and algorithms for driving/braking force controller 50 can be any combination of hardware and software that will carry out the functions of the present invention. In other words, "means plus function" clauses as utilized in the specification and disclosure should include any structure or hardware and/or algorithm or software that can be utilized to carry out the function of the "means plus function" clause.

Driving/braking force controller 50 performs an engine control by controlling the amount of fuel injected into engine 6, a throttle control by controlling the throttle position detected by a throttle controller 7, and a transmission control by controlling transmission 8. Particularly, driving/braking force controller 50 controls the driving torque via driving torque controller 9, which functions as driving force generating means. Driving torque controller 9 generates the driving force by controlling an engine output of engine 6 and a gear ratio of transmission 8, thereby generating a desired torque on wheels 10, 20, 30 and 40. Since vehicle 101 is a rear wheels drive vehicle, the driving wheels are wheels 30 and 40.

Driving/braking force controller 50 receives signals from an acceleration sensor 53, which includes both a longitudinal G-sensor and a lateral G-sensor, and each of wheel velocity sensors 13, 23, 33 and 43, which are mounted on each of wheels 10, 20, 30 and 40. Driving/braking force controller 50 also receives a signal from a master cylinder hydraulic pressure sensor 54, which detects a master cylinder hydraulic pressure Pm, and a signal from an accelerator position sensor 55, which detects an accelerator pedal depression amount Acc. Additionally, driving/braking force controller 50 receives a signal indicative of a wheel axle driving torque Tw from driving torque controller 9.

Acceleration sensor 53 functions as lateral/longitudinal acceleration detecting means by producing a lateral/longitudinal acceleration signal indicative of the longitudinal acceleration Xg (longitudinal G) and lateral acceleration Yg (lateral G) of vehicle 101. Acceleration sensor 53 also functions as wheel load detecting means by producing the lateral/longitudinal acceleration signals which are indicative of the wheel loads on each of wheels 10, 20, 30 and 40. In other words, the acceleration sensor 53 acts as a wheel load sensor since the lateral/longitudinal acceleration signals can be considered wheel load signals that can be used by driving/braking force controller 50 to determine the wheel loads on each of wheels 10, 20, 30 and 40.

Wheel velocity sensors 13, 23, 33 and 43 function as wheel velocity detecting means by producing wheel velocity signals indicative of the wheel velocities Vwi. The electrical wheel velocity signals are sent to driving/braking force controller 50. In the wheel velocity signal Vwi, "i" denotes a whole number from one to four that is assigned to each wheel. More specifically, Vw1 is the velocity of front left wheel 10, Vw2 is the velocity of front right wheel 20, Vw3 is the velocity of rear left wheel 30, and Vw4 is the velocity of rear right wheel 40. Master cylinder hydraulic pressure sensor 54 detects a master cylinder hydraulic pressure Pm. Accelerator position sensor 55 measures an accelerator pedal depression amount Acc. These sensors 13, 23, 33, 43, 53, 54 and 55 are provided to detect or measure various operating conditions of the engine, and then produce electrical signals that represent the measurement. Since sensors such as sensors 13, 23, 33, 43, 53, 54 and 55 are well known in the art, the structure and functions of the sensors 13, 23, 33, 43, 53, 54 and 55 would be obvious to one of ordinary skill in the art without further explanation herein. Accordingly, it will be apparent to those skilled in the art from this disclosure that sensors 13, 23, 33, 43, 53, 54 and 55 can be any type of sensors that will carry out the present invention.

When driving/braking force controller 50 executes the road surface friction coefficient estimation of the present invention while the vehicle 101 is traveling in a steady state, driving/braking force controller 50 generates a driving force on some of wheels 10, 20, 30 and 40 and simultaneously generates a braking force having the same magnitude as the driving force on some or all of the remaining wheels 10, 20, 30 and 40. Then, driving/braking force controller 50 estimates the road surface friction coefficient based on the driving and braking forces, the wheel velocity, and the wheel loads. In this manner, the friction coefficient of the road surface can be estimated accurately, and therefore, the performance of the vehicle 101 control can be improved even while the vehicle 101 is traveling without acceleration or deceleration.

While driving/braking force controller 50 is performing a road surface friction coefficient estimation control, driving/braking force controller 50 concurrently performs an obstacle avoidance control and automatically generates a braking force when a predetermined set of conditions is met.

In this embodiment, a millimetric wave radar controller or radar device 61 and a single-lens camera controller or lane indicator 62 are also installed on vehicle 101 as external sensors for vehicle obstacle avoidance control. Millimetric wave radar controller 61 functions as distance detecting means. Millimetric wave radar controller 61 produces and outputs to driving/braking force controller 50 a distance signal indicative of the distance Lx between vehicle 101 and an obstacle as detected by millimetric wave radar controller 61. Single-lens camera controller 62 functions as same lane determination means. Single-lens camera controller 62 produces and outputs to driving/braking force controller 50 a same lane determination signal Fc as determined by an image in a camera of single-lens camera controller 62, which is indicative of whether vehicle 101 and the obstacle are in the same lane. Millimetric wave radar controller 61 and single-lens camera controller 62 communicate with each other to perform the obstacle avoidance control. More specifically, when millimetric wave radar controller 61 recognizes an obstacle, single-lens camera controller 62 determines whether or not the obstacle is in the same lane. The distance signal, which is indicative of the distance Lx between vehicle 101 and the obstacle, is inputted into driving/braking force controller 50 from millimetric wave controller 61. Further, when single-lens camera controller 62 determines that the obstacle is in the same lane, an ON signal is inputted into driving/braking force controller 50 from single-lens camera controller 62. The ON signal functions as the same-lane determination signal Fc, which indicates that the obstacle is in the same lane. Upon receiving the distance signal and the ON signal, driving/braking force controller 50 functions as deceleration signal producing means. Driving/braking force controller 50 produces a deceleration signal in accordance with the distance signal and the ON signal.

If signals from the external sensors are used for other vehicle controls such as automatically following another vehicle, in addition to obstacle avoidance control, the signals from these external sensors can also be used to automatically accelerate or decelerate the vehicle 101 while these other vehicle controls are being executed. In this case, driving/ braking force controller 50 also functions as acceleration/deceleration signal producing means. Driving/braking force controller 50 produces an acceleration/deceleration signal in accordance with the distance signal and the ON signal.

Figure 2:
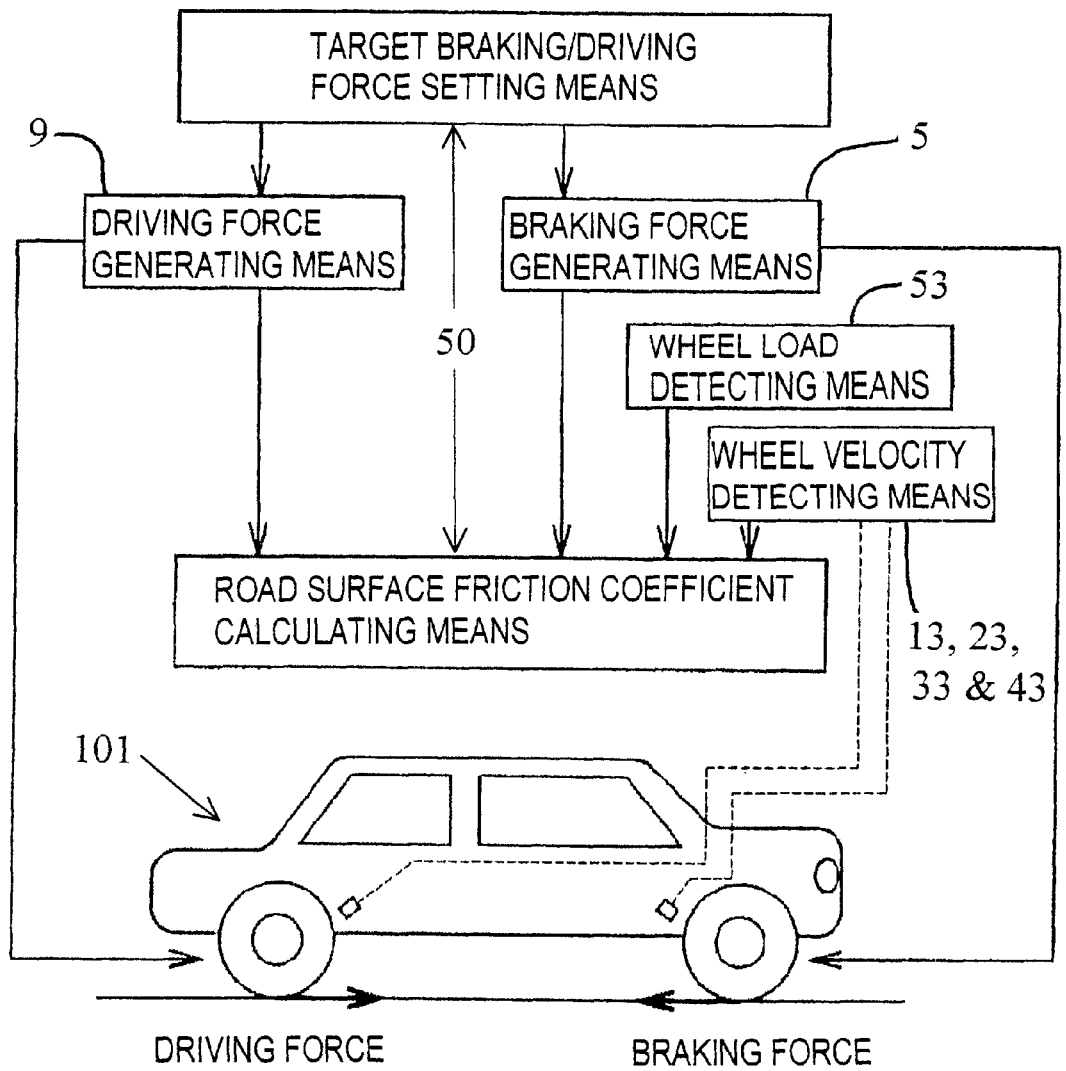
FIG. 2 is a block diagram of the road surface friction coefficient estimating apparatus for a vehicle in accordance with the selected embodiments of the present invention.

The functions of estimating apparatus 100 are schematically illustrated in FIG. 2. FIG. 2 is a block diagram of road surface friction coefficient estimating apparatus 100 shown in FIG. 1. The block diagram shows the functions of the various means for estimating a road surface friction coefficient. In FIG. 2, vehicle 101 includes driving/braking force controller 50 that serves as both the target driving/braking force setting means and the road surface friction coefficient calculating means, driving torque controller 9 that serves as the driving force generating means, brake fluid pressure controller 5 that serves as braking force generating means, wheel velocity sensors 13, 23, 33 and 43 that serve as wheel velocity detecting means, and acceleration sensor 53 that serves as wheel load detecting means.

The estimating apparatus 100 of the present invention estimates the road surface friction coefficient as follows. First, driving/braking force controller 50 sets a pre-selected force to be generated. Then, driving torque controller 9 generates a driving force on at least one of wheels 10, 20, 30 and 40 of vehicle 101 in accordance with the pre-selected force set by driving/braking force controller 50. When driving/braking force controller 50 sets a driving force or the pre-selected force for the purpose of road surface friction coefficient estimation, and thereby causes acceleration to vehicle 101, driving/braking force controller 50 suppresses the acceleration of vehicle 101 by simultaneously generating counter braking force that is of the magnitude to cancel the original driving force or the pre-selected force. Then, pressure controller unit 5 generates a braking force in at least one of the other wheels 10, 20, 30 and 40 in accordance with the counter braking force set by driving/braking controller 50. The counter braking force is configured to cancel the driving force. Stated differently, driving/braking force controller 50 controls both brake fluid pressure controller 5 and driving torque controller 9 such that the driving force and the counter braking force are generated such that the driving force and the counter braking force cancel out. Consequently, vehicle 101 is not affected by the acceleration/deceleration generated for the purpose of road surface friction coefficient estimation. Thereafter, the road surface friction coefficient is estimated based on the driving and braking forces, wheel velocity, and wheel load. In the meantime, the acceleration or deceleration of vehicle 101 resulting from the driving force and braking force is suppressed.

In conventional road surface friction coefficient estimating apparatuses, it is difficult to obtain an accurate estimate of the road surface friction coefficient unless a driving force or a braking force is being generated on a wheel, to accelerate or decelerate vehicle 101. Driving/braking force controller 50 of the present invention, on the other hand, enables accurate estimation of the friction coefficient of the road surface on which vehicle 101 is traveling, even while vehicle 101 is traveling in a steady state.

Moreover, in the case of a conventional road surface friction coefficient apparatus, when the controller simply generates a driving force or a braking force solely for the purpose of estimating the road surface friction coefficient while the vehicle is traveling in a steady state, the vehicle, which was not accelerating or decelerating, would experience a sudden acceleration or deceleration as a result of the generated forces. Consequently, the change in velocity would cause an enormous annoyance to the driver. On the other hand, estimation apparatus 100 of the present invention does not result in any change in the velocity of vehicle 101. Accordingly, an annoyance to the driver can be prevented.

Also, estimating apparatus 100 of the present invention does not require any new or special sensor. If a new or special sensor that contacts the road surface, such as one in the shape of a small wheel, needs to be installed to the vehicle, additional issues will arise such as an increase in the price of the vehicle due to the cost of the sensor and a need to determine where to mount the sensor. Since estimating apparatus 100 of the present invention does not require a new or special sensor, no such problems are present.

Referring back to FIG. 2, driving/braking force controller or target driving/braking force setting means 50 further calculates a target driving and braking forces to be generated. Driving torque controller or driving force generating means 9 generates a driving force on at least one of wheels 10, 20, 30 and 40 in accordance with the target driving force set by target driving/braking force setting means 50. Meanwhile, brake fluid pressure controller or braking force generating means 5 generates a braking force on at least one of other wheels 10, 20, 30 and 40 in accordance with the target braking force set by target driving/braking force setting means 50, such that the total magnitude of the braking forces cancels the total magnitude of the driving forces. Road surface friction coefficient calculating means 50 calculates the road surface friction coefficient based on the wheel load, the wheel velocity and the driving and braking forces.

Driving torque controller 9 generates the aforementioned driving force by generating a desired driving torque on at least one wheel 10, 20, 30 or 40. Brake fluid pressure controller 5 generates the aforementioned braking force by generating a desired braking torque on at least one of the other wheels 10, 20, 30 or 40. In accordance with this embodiment, driving torque controller 9 controls the generation of the driving force by controlling the output of engine 6 and the gear ratio of transmission 8.

When driving/braking force controller 50 generates the driving force or braking force for the purpose of the estimation during the road surface friction coefficient estimation control, it is further preferable to prevent the acceleration/deceleration from affecting lateral and rotational motions of vehicle 101, in addition to suppressing the longitudinal acceleration or deceleration of vehicle 101, which occur as a result of the driving force and braking force generated. Therefore, it is preferable to configure driving torque controller 9 and brake fluid pressure controller 5 so that when they generate driving and braking forces, the driving and braking forces are distributed among the wheels 10, 20, 30 and 40 in such a manner that the lateral motion and rotational motion of vehicle 101 are not affected, during estimation of the road surface friction coefficient.

Figure 8:
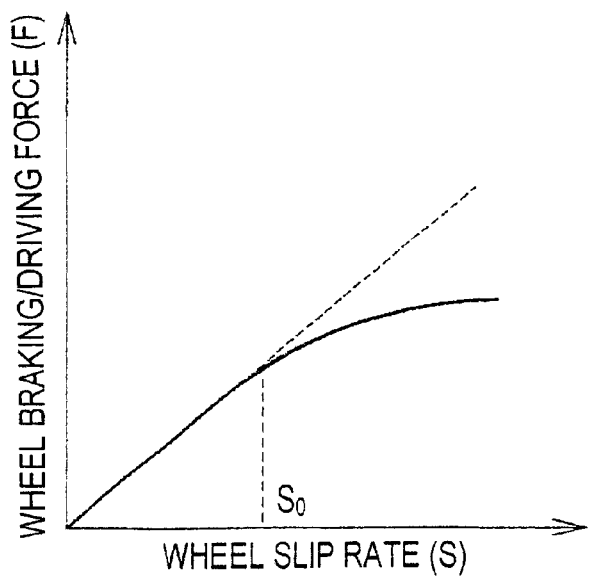
FIG. 8 is a graph illustrating the relationship between the wheel slip rate S and the wheel driving/braking force F for use in the selected embodiments of the present invention.
Figure 12:
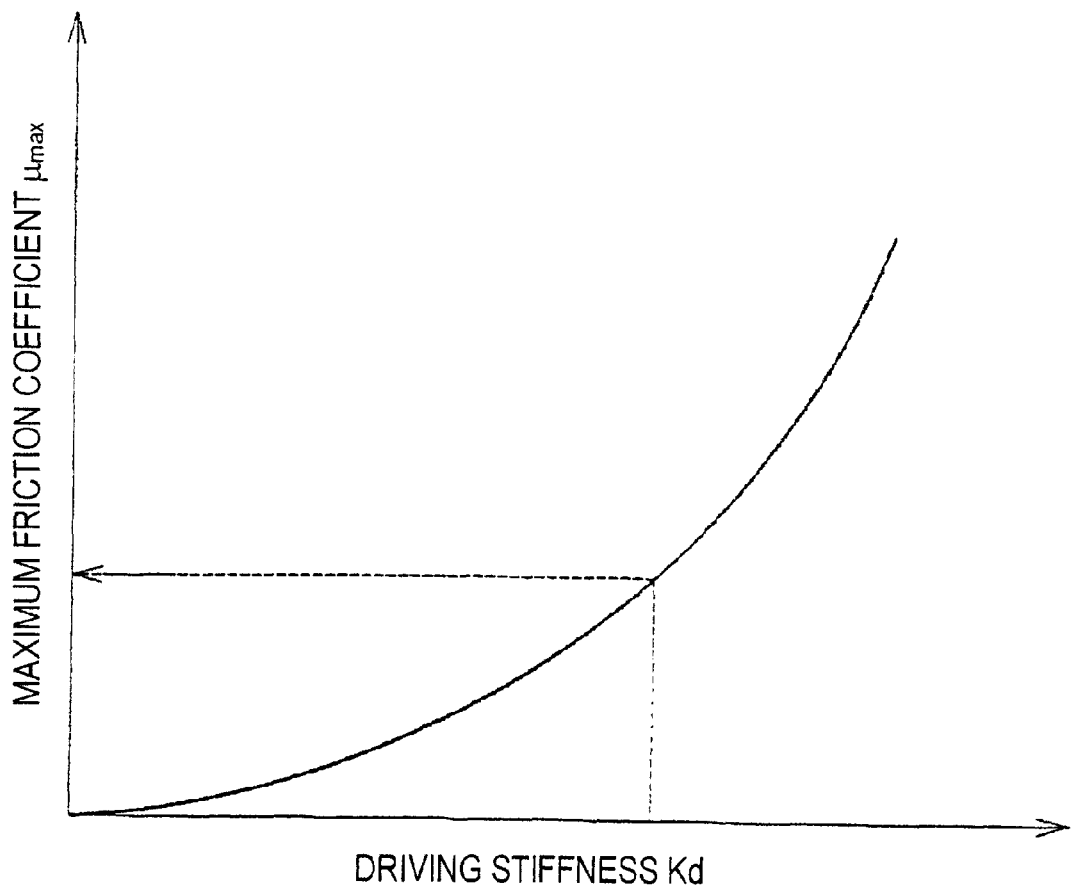
FIG. 12 is a graph illustrating the relationship between the driving stiffness and the maximum road surface friction coefficient, for use in the selected embodiments of the present invention.

Referring to FIGS. 8 and 12, a condition for executing the road surface friction coefficient estimation will now be discussed. Slip rate S indicates the slipperiness of wheels 10, 20, 30 and/or 40. The driving stiffness Kd indicates responsiveness of wheels 10, 20, 30 and/or 40 to a force applied thereto. As shown in FIG. 8, the slip rate S of the road and wheel driving/braking force are in a linear relation in a range in which the slip rate S is between 0 and $S_0$. Accordingly, the relationship between the road surface friction coefficient $\mu$max and the driving stiffness Kd is as shown in FIG. 12 only while the slip rate S and the wheel driving/braking force are in a linear relation. In other words, once the slip rate S exceeds $S_0$, the slip rate S and the wheel driving/braking force are no longer in a linear relation. Consequently, the road surface friction coefficient cannot be estimated accurately when the slip rate S is above $S_0$. Therefore, it is further preferable for driving torque controller 9 and brake fluid pressure controller 5 to be configured such that generation of driving and braking forces is terminated once the slip rate S of any one of wheels 10, 20, 30 and 40 reaches $S_0$, even while driving torque controller 9 and brake fluid pressure controller 5 are in the midst of generating driving and braking forces.

Acceleration sensor 53 serves as wheel load detecting means. Acceleration sensor 53 detects the wheel load and sends a signal to driving/braking force controller 50 which adds or subtracts a load shift quantity to or from a static wheel load of each wheel 10, 20, 30 or 40. The load shift quantity is the weight of vehicle 101 shifted to wheels 10, 20, 30 and 40. The load shift quantity is calculated based on the lateral/longitudinal acceleration signal, which is indicative of the longitudinal acceleration and lateral acceleration of the vehicle body. In this embodiment, as will be discussed below, acceleration sensor or wheel load detecting means 53 together with driving/braking force controller 50 can determine a wheel load that takes into account the load shift quantity by using the signals provided by acceleration sensor 53.

Driving/braking force controller 50 estimates the road surface friction coefficient in the following manner. Driving/braking force controller 50 which serves as road surface friction coefficient calculating means plots points on a two-dimensional coordinates having a wheel velocity axis and a driving/braking force per unit wheel load axis. Each point represents the wheel velocity and the driving/braking force per unit wheel load of a wheel. Driving/braking force controller 50 identifies a regression line from the points. The regression line represents at least two of the points. Then, driving/braking force controller 50 estimates the vehicle velocity and the road surface friction coefficient from the regression line on the two dimensional coordinates. Thus, driving/braking force controller 50 which serves as road surface friction coefficient calculating means includes plotting means for plotting points on a two-dimensional coordinates having a wheel velocity axis and a driving/braking force per unit wheel load axis, and regression line means for identifying a regression line from the points.

The vehicle velocity is estimated based on the value of the wheel velocity where the regression line intersects the wheel velocity axis of the two dimensional coordinates. Further, the road surface friction coefficient is estimated based on a driving stiffness Kd which is equal to the slope angle of the regression line with respect to the wheel velocity axis. Thus, driving/braking force controller 50 estimates the road surface friction coefficient based on the relationship between the driving stiffness Kd and the maximum road surface friction coefficient $\mu_{max}$ shown in FIG. 12. Accordingly, the driving/braking force controller 50 which serves as road surface friction coefficient calculating means includes estimation means for estimating the vehicle velocity based on the value of the wheel velocity where the regression line intersects the wheel velocity axis of the two dimensional coordinates, and the road surface friction coefficient based on a slope angle of said regression line with respect to the wheel velocity axis.

Preferably, driving/braking force controller 50 sets the target driving/braking forces in such a manner that the braking force and driving force are generated and estimation of the road surface friction coefficient is conducted every predetermined period of time, such as 180 seconds.

When the driver operates vehicle 101 to generate a more than predetermined amount of braking force or driving force, driving/braking force controller 50 can set the target driving/braking force such that the road surface friction coefficient is estimated regardless of the predetermined period of time.

When estimating apparatus 100 generates a driving force and a counter braking force in order to execute road surface friction coefficient estimation control, the driving force and the counter braking force are generated simultaneously, such that the driving force and the counter braking force have such magnitudes that suppress the effect of the driving force and braking force. Meanwhile, a response characteristics of driving torque controller 9 and brake fluid pressure controller 5 may differ. In other words, driving torque controller 9 and brake fluid pressure controller 5 can respond differently to the driving and braking forces applied thereto. If the difference in the response characteristics of driving torque controller 9 and brake fluid pressure controller 5 is great enough to affect the suppression of changes in acceleration/deceleration, it is preferred to set the target driving/braking forces such that this suppression of changes in acceleration or deceleration is unaffected by the difference in response characteristics. Therefore, driving/braking force controller 50 should detect the response characteristic of driving torque controller 9 and brake fluid pressure controller 5, and set the target driving/braking forces for driving torque controller 9 and brake fluid pressure controller 5 while taking into account the response characteristics exhibited by driving torque controller 9 and brake fluid pressure controller 5.

Still alternatively, driving/braking force controller 50 can add a target driving/braking force to a requested value when the driver requests generation of a driving/braking force.

Still alternatively, driving/braking force controller 50 can set the target driving/braking force to zero when the lateral acceleration or yaw rate of the vehicle 101 equals or exceeds a predetermined value as determined by driving/braking force controller 50. In this case, acceleration sensor 53 functions as lateral acceleration/yaw rate detecting means, and produces an acceleration signal indicative of a lateral acceleration/yaw rate.

Figure 3:
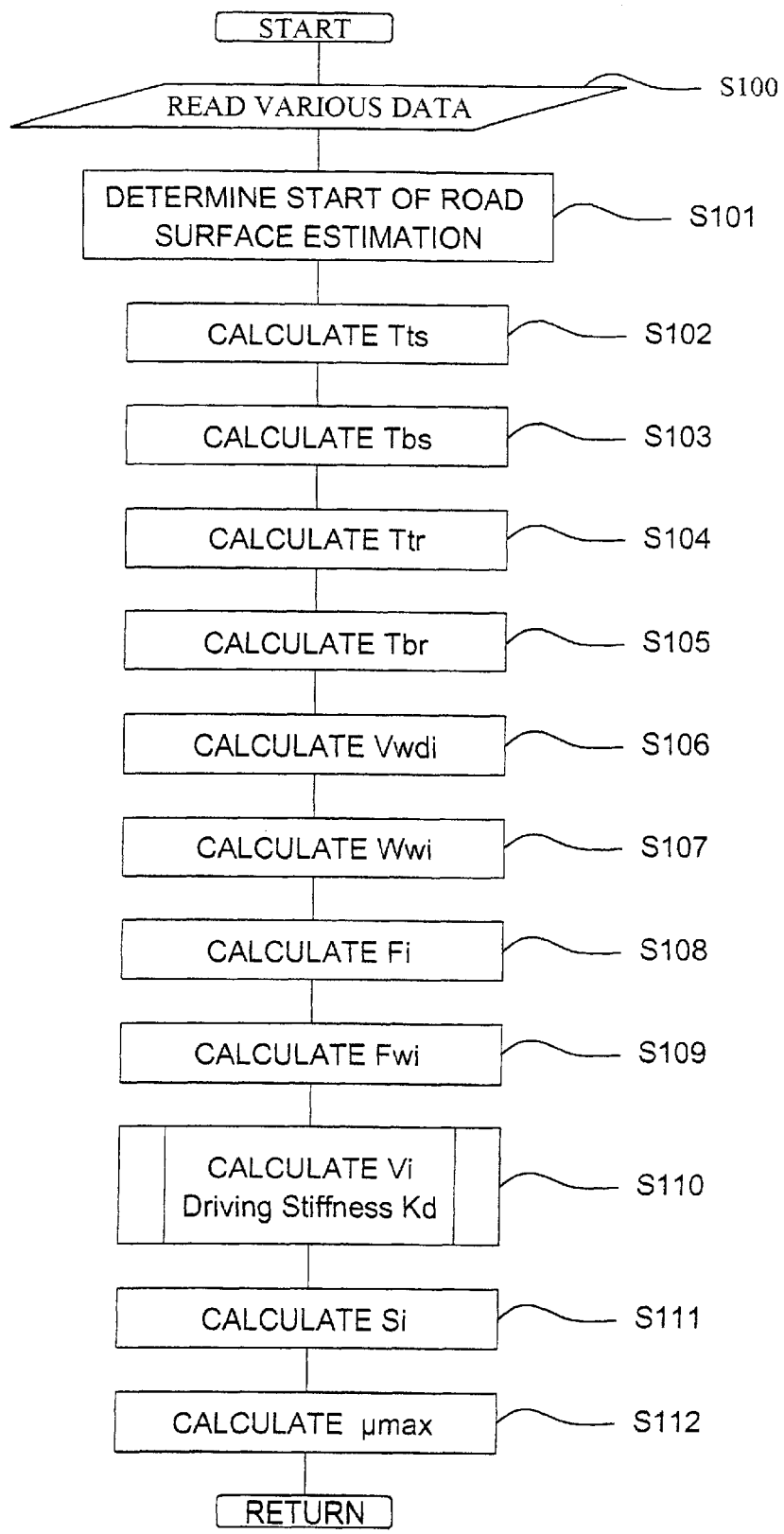
FIG. 3 is a flowchart of the road surface friction coefficient estimation in accordance with the first embodiment of the present invention.
Figure 4:
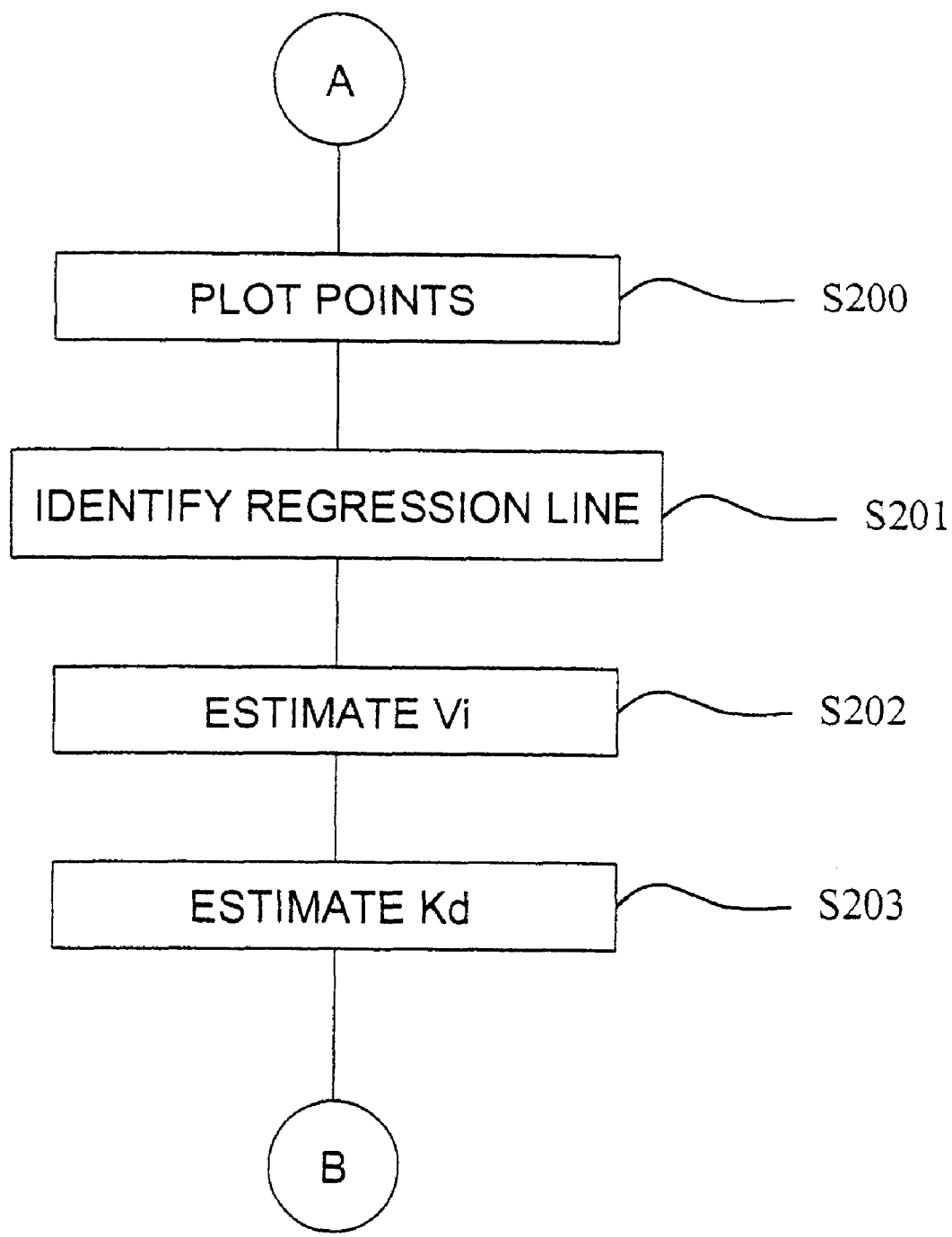
FIG. 4 is a flowchart of a subroutine of calculating vehicle velocity Vi and driving stiffness Kd, which corresponds to step S110 in FIG. 3.
Figure 5:
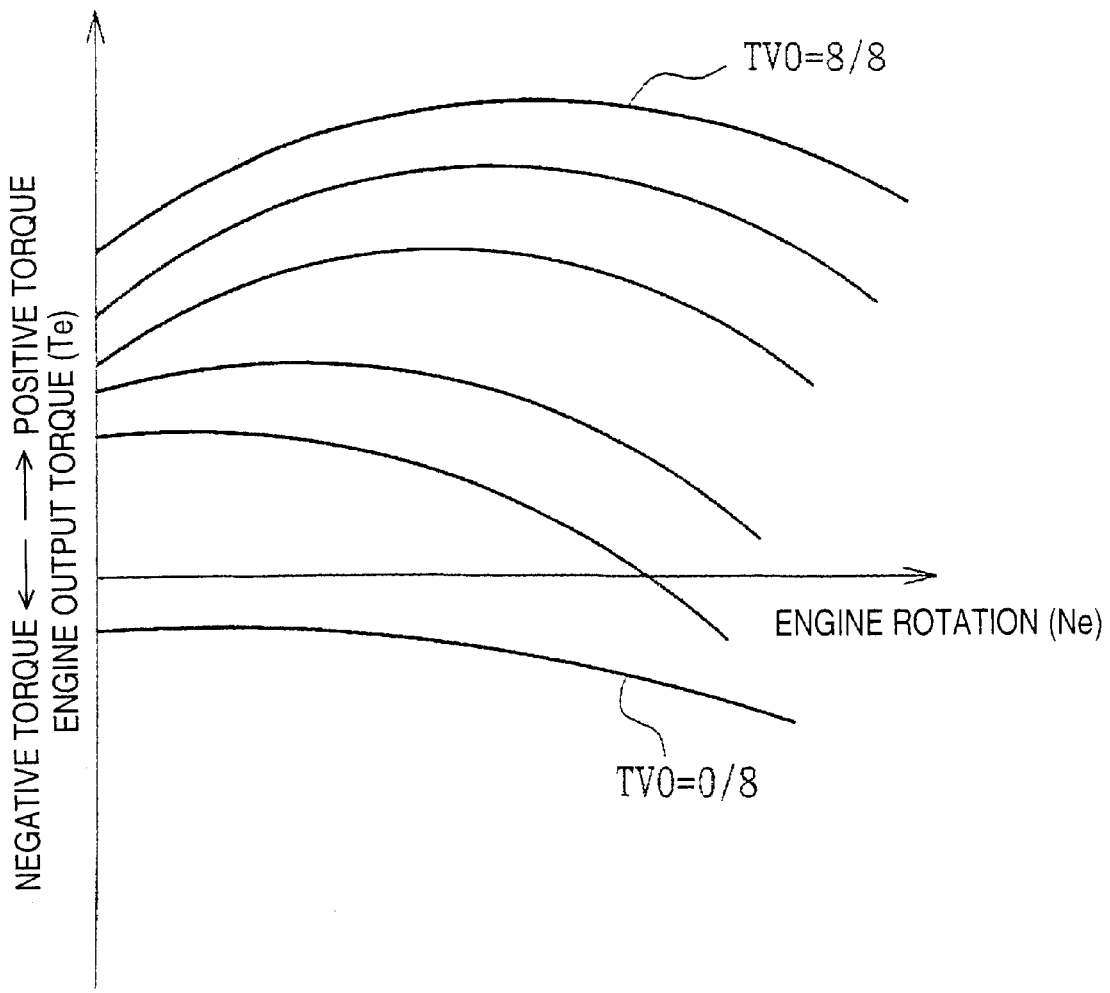
FIG. 5 is a graph illustrating an engine performance characteristic by the relationship between engine torque Te and engine rotation Ne, to determine an engine output torque for use in the road surface friction coefficient estimation in accordance with the selected embodiments of the present invention.
Figure 6:
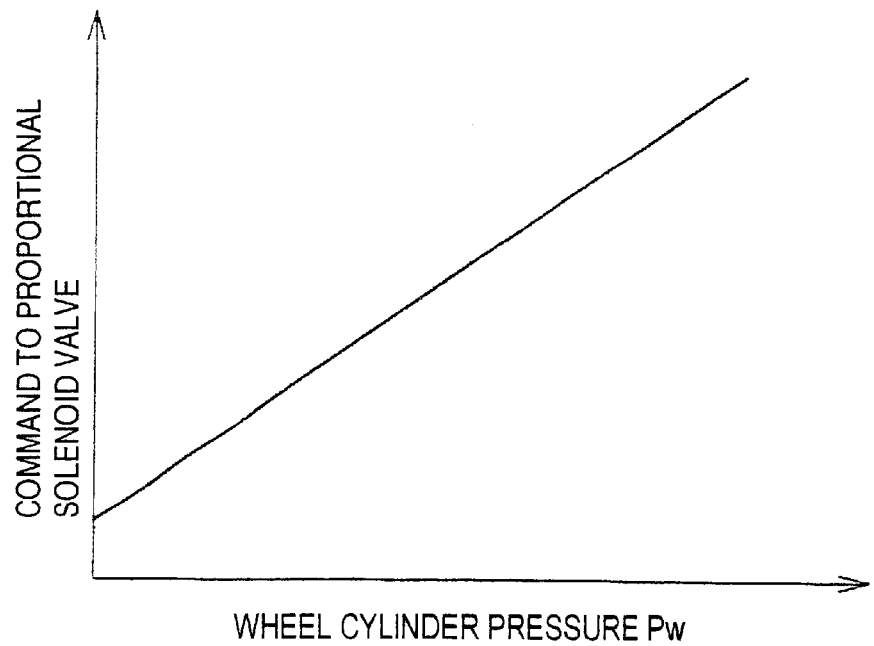
FIG. 6 is a graph illustrating the relationship between the wheel cylinder pressure Pw and the command sent to the proportional solenoid valve by the brake fluid pressure controller for use in the selected embodiments of the present invention.

FIG. 3 is a flowchart of the road surface friction coefficient estimation executed by driving/braking force controller 50 in accordance with the first embodiment of the present invention. This road surface friction coefficient estimation includes steps S100–S112. More specifically, step S100 reads in various data. Step S101 determines whether the road surface friction coefficient estimation should be started. Step S102 calculates a target driving torque. Step S103 calculates a target braking torque. Step S104 calculates a real driving torque. Step S105 calculates a real braking torque. Step S106 calculates wheel accelerations. Step S107 calculates wheel loads. Step S108 calculates driving/braking force of each wheel. Step S109 calculates a driving force per unit wheel load. Step S110 calculates a vehicle body velocity and driving stiffness. Step S111 calculates a slip rate of each wheel. Step S112 estimates a maximum road surface friction coefficient.

Figure 13:
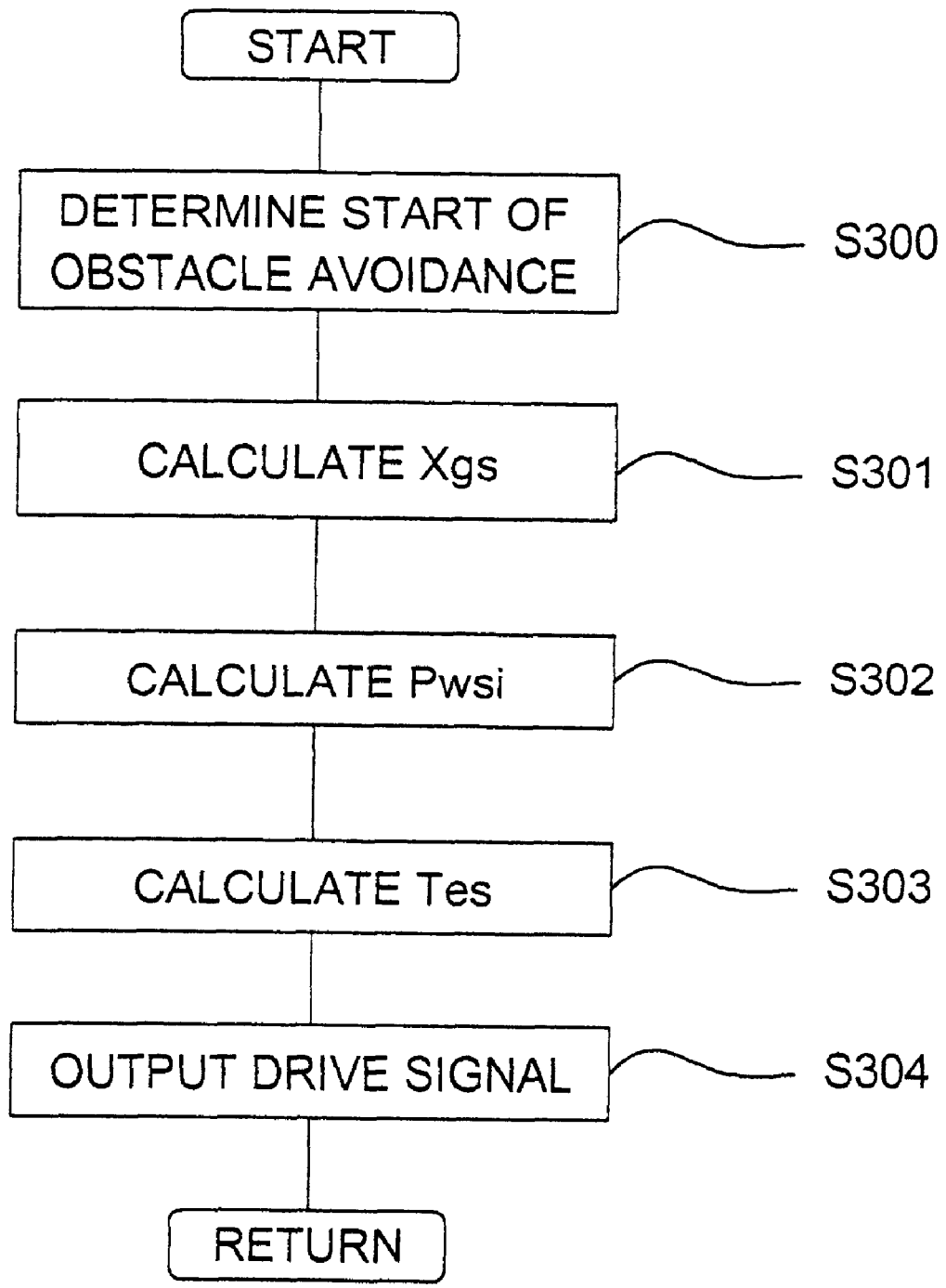
FIG. 13 is a flowchart of an obstacle avoidance control to be executed concurrently with the road surface friction coefficient estimation in accordance with the selected embodiments of the present invention.

Basically, once a driving force is generated on prescribed wheels in order to estimate the road surface friction coefficient, a counter braking force is generated on other wheels simultaneously therewith, or in a substantially simultaneous manner. The magnitude of the counter braking force is such that the change in acceleration or deceleration resulting from the generated driving force is canceled by the braking force. While suppressing the acceleration or deceleration of vehicle 101 that results from the generation of these driving and counter braking forces, and while the driving force and the counter braking force are actually being generated, processes of estimating the road surface friction coefficient based on the wheel load, wheel velocity, and driving/braking force are executed. These processes are shown in steps S100 to S112. In addition, in this embodiment, obstacle avoidance control, which takes place in steps S300 to S304 shown in FIG. 13, is executed concurrently with the road surface friction coefficient estimation. These steps S300 to S304 are executed by an operating system (not shown in figures) stored in driving/braking force controller 50 by periodically interrupting at a predetermined time interval.

In step S100, driving/braking force controller 50 reads various data from the aforementioned sensors 13, 23, 33, 43, 53, 54 and 55, and controllers 9, 61 and 62. More specifically, acceleration sensor 53 reads a longitudinal acceleration Xg and a lateral (left-right) acceleration Yg. Wheel velocity sensors 13, 23, 33 and 43 detect the wheel velocities Vwi (i=1 to 4). Master cylinder hydraulic pressure sensor 54 detects the master cylinder hydraulic pressure Pm. Accelerator position sensor 55 measures an accelerator position Acc. Driving torque controller 9 measures driving torque Tw. Millimetric wave radar controller 61 detects the distance Lx to obstacle. Single-lens camera controller 62 produces the same-lane determination signal Fc.

In the preferred embodiment, distance Lx information and same-lane determination signal Fc information are read because these signals are used as control parameters for vehicle controls. For instance, these signals are utilized for determining whether obstacle avoidance control should be started, and for the operation of obstacle avoidance control itself. The obstacle avoidance control is executed in this embodiment as an example of vehicle control that utilizes the road surface friction coefficient value obtained by the road surface friction coefficient estimation process described below.

Determine Start of Road Surface $\mu$ Estimation

The next step S101 of this program determines whether the road surface friction coefficient estimation should be started. Road surface friction coefficient is hereinafter referred to as road surface $\mu$ for the sake of simplicity.

The road surface $\mu$ estimation mentioned herein refers to a control that simultaneously generates in order to estimate road surface $\mu$ a driving force and a counter braking force which have the same magnitude. In other words, this control differs from a control that estimates the road surface $\mu$ when the driver is accelerating or braking, such as during an anti-skid control, in which case there is no simultaneous generation of a driving force and a counter braking force of the magnitudes to cancel each other in order to estimate road surface $\mu$.

With this embodiment, for the purposes of setting the target driving/braking force, generating braking and counter driving forces, and estimating the road surface $\mu$ periodically, the determination of whether or not to start the road surface $\mu$ estimation is conducted at every predetermined period of time Tc. For instance, Tc is 180 seconds. Since the road surface $\mu$ is estimated every predetermined period of time, the most recent estimate obtained can be utilized for vehicle controls such as obstacle avoidance. Therefore, if it is determined that obstacle avoidance control has to be operated to avoid an obstacle while the vehicle 101 is in a steady traveling state, the most recent road surface $\mu$ or one estimated in the immediately preceding cycle can be utilized for the obstacle avoidance. Since the obstacle avoidance utilizes most recent road surface $\mu$ it is possible to generate braking force that is most adequate to avoid the obstacle.

Further, it is preferable to conduct the determination in accordance with the traveling state of the vehicle 101. For example, the road surface $\mu$ estimation control is not started when the vehicle 101 is experiencing a lateral acceleration Yg that exceeds a predetermined value. For instance, the predetermined value is 0.4 g. The estimation is not started in such cases because, when the vehicle 101 is turning and the lateral acceleration is large, the road surface $\mu$ estimation is more likely to affect the driving of the vehicle 101. Thus, it would cause an annoyance to the driver if the road surface $\mu$ estimation is executed while the vehicle 101 is experiencing a great lateral acceleration.

In this determination, a yaw rate may be used instead of the lateral acceleration. Thus, driving/braking force controller 50 can be configured such that a yaw rate that corresponds to the predetermined lateral acceleration is calculated, and that the road surface $\mu$ estimation control is not started when vehicle 101 is experiencing a yaw rate that equals or exceeds the predetermined yaw rate.

In order not to start the road surface $\mu$ estimation, it is possible to configure the control program beforehand such that processes associated with the road surface $\mu$ estimation control are skipped if driving/braking force controller 50 determines that road surface $\mu$ estimation is not to be started, thereby stopping the execution of the road surface $\mu$ estimation.

Alternatively, the road surface $\mu$ estimation can be practically stopped by modifying equations used for calculating parameters. More specifically, where the target driving torque and the target braking torque are calculated in steps S102 and S103 as in the case of this embodiment, parts of the equations utilized for the calculation are set to zero.

In this case, since the parts for the target driving and braking forces can be set to zero, road surface $\mu$ estimation control that generates a driving force and a braking force simultaneously is practically not executed. As a result, even when steps S102 to S112 are executed, annoyance to the driver can be avoided if the lateral acceleration or yaw rate equals or exceeds the predetermined value. Furthermore, the control program is simplified.

Meanwhile, once it is determined that the road surface $\mu$ estimation should be started, driving/braking force controller 50 continues the estimation for a predetermined period of time. Here again, however, it is possible to add a process that suspends the road surface $\mu$ estimation when the slip rate S, which is calculated in step S111 (discussed later), of any of wheels 10, 20, 30 and 40 equals or exceeds a predetermined value $S_0$. Since slip rate S has not been calculated in this cycle, the value of slip rate S calculated in the previous cycle is utilized in this step.

With this arrangement, even when driving/braking force controller 50 has already started the road surface $\mu$ estimation as a result of the aforementioned determination and generated the driving force and braking force, the generation of the driving force and braking force can be suspended when the slip rate S of any of wheels 10, 20, 30 and 40 equals or exceeds the predetermined value $S_0$. Thus, it is possible to precisely stop the road surface $\mu$ estimation that utilizes a simultaneous generation of a driving force and a braking force.

In other words, a valid range of the slip rate S for execution of the road surface estimation control is defined as below the predetermined value $S_0$. Accordingly, an accurate estimation of road surface $\mu$ can be ensured. Also, as discussed later, when the aforementioned target driving/braking force is configured variably in accordance with the history of past road surface $\mu$ estimate values, the accuracy of the estimation can be further improved by reflecting the past road surface $\mu$ estimate values onto the target braking/driving forces in the variable setting processing.

Even if the estimation control is suspended midway for any reason, the suspension does not affect the acceleration or deceleration of the vehicle 101 because the driving force and braking force are generated such that they will cause no change in acceleration or deceleration of vehicle 101 in the first place. Consequently, even if the driving and braking forces are suspended at the same time, no change in acceleration or deceleration results from the suspension. Thus, the advantage of the present invention to prevent annoyance to the driver caused by change in acceleration or deceleration is retained.

Also, when the driver executes within the predetermined period of time cycle Tc a driving/braking operation that causes the accelerator position Acc or master cylinder hydraulic pressure Pm to reach or exceed a predetermined value, driving/braking force controller 50 determines at the time of the operation that the road surface $\mu$ estimation should be started. For example, the predetermined value of the accelerator Acc is 20%, while the predetermined value of the master cylinder hydraulic pressure Pm is 5 MPa. Consequently, when the driver performs an operation by which the accelerator position Acc or the hydraulic pressure Pm equals or exceeds the aforementioned predetermined value, the settings of target driving/braking force in steps S102 and S103 can be executed such that the road surface $\mu$ estimation is conducted without adherence to fixed time cycle Tc. In this case, target driving/braking force is calculated by adding the operative driving/braking force generated by operation by the driver to the pre-selected force generated for the purpose of road surface $\mu$ estimation.

When the driver produces driving/braking force, it is even less likely to cause an annoyance to the driver from the road surface $\mu$ estimation because the driving force and the braking force for estimating the road surface $\mu$ are generated as the driver performs such operations. Therefore, in order not to cause an annoyance to the driver, the driving force and the braking force should be generated in synchronization with the operations by the driver. In this manner, the annoyance to the driver can be prevented more effectively.

Also in this case, the predetermined period of time Tc is reset as the road surface $\mu$ estimation is started. After the estimation is finished, the determination is executed every predetermined period of time. In this manner, the road surface $\mu$ can be estimated every predetermined period of time with the least annoyance to the driver.

The driving force and counter braking force for estimating the road surface $\mu$ are generated in a simultaneous manner. In the meantime, the acceleration or deceleration generated from the driving force and counter braking force is suppressed. In this embodiment, in order to estimate the road surface $\mu$, a driving torque is generated on the two rear wheels 30 and 40, which are driving wheels, and a counter braking torque is generated on the two front wheels 10 and 20, which are non-driving wheels.

In this program of the present embodiment, Equations 1, 2a and 2b discussed below show that the total sum of the counter braking forces generated on the two front wheels 10 and 20 have the magnitude to cancel the total sum of the driving forces generated on the two rear wheels 30 and 40.

Calculate Target Driving Torque Tts, and Target Braking Torque Tbs

In this embodiment, steps S102 and S103 calculate the target driving torque and the target braking torque for estimating the road surface $\mu$ while suppressing changes in the acceleration or deceleration of vehicle 101.

First, step S102 calculates the target driving torque Ttsi for estimating the road surface $\mu$. In this embodiment, the target driving torque Ttsi is obtained by the following Equation 1:

$$Ttsi = Ttasi + Tt0 \tag{1}$$

where i is any whole number from 1 to 4.

Ttasi is the driving torque from the acceleration operation by the driver of the accelerator pedal, and therefore is determined uniquely based on the amount of the accelerator pedal operation. In other words, Ttasi is 0 when the accelerator pedal is OFF (not depressed) and vehicle 101 is coasting.

The pre-selected torque Tt0 is a driving torque added for the purpose of estimating the road surface $\mu$. When it is determined that the road surface $\mu$ estimation should be stopped, the value of pre-selected torque Tt0 is set to zero, such that the driving torque Ttsi will not be generated for the purpose of estimating the road surface $\mu$. In this embodiment, the pre-selected torque Tt0 is a constant.

As discussed below, since the effect of the pre-selected torque Tt0 added for the purpose of estimating the road surface $\mu$ will be canceled by the counter braking torque that will also be added for the purpose of estimation, the pre-selected torque Tt0 can be any desired value. Accordingly, the braking torque is generated such that the acceleration or deceleration of vehicle 101 is not affected by the driving and braking torques. Therefore, there is no need to adjust the magnitude of the driving and braking torques to statuses of other controls such as traction control. Even while vehicle 101 is in a steady traveling state, there is a great flexibility as to the magnitude of the driving and braking torques that can be generated.

In this embodiment, the value of pre-selected torque Tt0 can be determined as a predetermined fixed value. However, as previously mentioned, it is also possible to change the value of pre-selected torque Tt0 in accordance with the history of estimates of the road surface $\mu$. More specifically, for example, the pre-selected torque Tt0 can be gradually increased when the past road surface $\mu$ estimates are a continuing series of large values. Conversely, the pre-selected torque Tt0 can be gradually decreased when the past road surface $\mu$ estimates are a continuing series of small values. The pre-selected torque Tt0 can be generated by controlling the engine output and/or a gear of the transmission 8 by driving torque controller 9.

In step S103, a target braking torque Thsi is calculated. In the calculation of the target braking torque Thsi in step S103, the target braking torque Thsi is given by the following Equations 2:

$$\text{Front wheels: } Tbsi = Tbbsi + Tt0 \times Wwf/Wwr \tag{2a}$$

$$\text{Rear wheels: } Tbsi = Tbbsi \tag{2b}$$

where Wwf is the front wheel load, Wwr is the rear wheel load and Tbbsi is an operative braking torque from a braking operation by the driver. Here, an effective radius R of the tires is the same for all the front and rear wheels 10, 20, 30 and 40.

Tbbsi is uniquely determined based on the amount of the brake operation. Therefore, the value of Tbbsi is 0 for both the front and rear wheels when the brakes are not operated. In calculation of target braking torque Thsi, the pre-selected torque Tt0 is added in such a manner that the acceleration or deceleration caused by the pre-selected torque Tt0 that is applied to drive the rear wheels 30 and 40 is canceled by the pre-selected torque applied to brake the front wheels 10 and 20. In other words, the pre-selected torque Tt0 is used in Equation 2a such that a change in acceleration or deceleration is prevented. Consequently, in principle, the value of pre-selected torque Tt0 for estimation of the road surface $\mu$ can be set at any value.

When it is determined that the road surface $\mu$ estimation should be stopped, the pre-selected torque Tt0 is set to zero in the calculation of the target driving torque Ttsi. Accordingly, the pre-selected torque Tt0 is also set to zero in the calculation of the target braking torque Thsi. When the value of pre-selected torque Tt0 is varied based on the past road surface $\mu$ in Equation 1, the value of pre-selected torque Tt0 to be used for calculation of the target braking torque Thsi in Equation 2a is varied accordingly. More specifically, when the pre-selected torque Tt0 in Equation 1 is varied in response to the past road surface $\mu$ values, the value of pre-selected torque Tt0 for the calculation of the braking torque part in Equation 2a discussed below is likewise increased or decreased.

Practically, however, the driving and counter braking forces to be generated cannot be increased limitlessly, no matter how gradually. Accordingly, there must be a limit for a maximum value of the pre-selected torque Tt0; The same situation arises with regards to the minimum value of the pre-selected torque Tt0. If the driving force to be generated is too small, and therefore the counter braking force to be generated simultaneously is too small, the road surface $\mu$ estimation that utilizes the generation of a driving force and braking force cannot be conducted satisfactorily. In other words, the driving/braking forces to be generated cannot be reduced indefinitely. Therefore, there is a fixed lower limit for the value of pre-selected torque Tt0.

Nevertheless, it is not that the value of pre-selected torque Tt0 cannot be adjusted freely. Specifically, it is not that the value of pre-selected torque Tt0 cannot be set freely because the estimation of road surface $\mu$ cannot be performed unless during the operation of traction control. To the contrary, as long as the value of pre-selected torque Tt0 is between the lower and upper limits, the pre-selected torque Tt0 can be set at any desired value, such that a driving force and a braking force can be generated and an acceleration of vehicle 101 is suppressed. In this manner, there is more flexibility in the execution of the road surface $\mu$ estimation.

Thus, by varying the target driving/braking forces based on the past road surface $\mu$ values as described above, generation of the driving/braking forces and the road surface $\mu$ estimation can be conducted in a manner that corresponds to the road condition. More specifically, the values of pre-selected torques Tt0 in Equations 1 and 2a are increased when, in view of the past data, the road surface $\mu$ is determined to be relatively large. In other words, the value of pre-selected torque Tt0 is larger when the road surface is relatively non-slippery. Meanwhile, the road surface $\mu$ estimation can be conducted with a decreased value of pre-selected torque Tt0 when the road surface $\mu$ is determined to be relatively small. In other words, the value of pre-selected torque Tt0 is small when the road surface is relatively slippery. As a result, the road surface $\mu$ estimation can be performed in various situations, not only where the value of pre-selected torque Tt0 is fixed at a constant value regardless of the values of the actual road surface $\mu$ and a road surface $\mu$ estimate. Accordingly, the road surface $\mu$ can be more precise and tailored to specific conditions of the road.

As mentioned previously, Tt0 suppresses the acceleration or deceleration generated for estimation of the road surface $\mu$. In the range of slip rate in which the driving/braking force of a tire is in a linear relationship with slip rate, the pre-selected torque Tt0 is the driving torque applied to the driving wheels (rear wheels 30 and 40) for the purpose of the road surface $\mu$ estimation in step S102. Accordingly, the braking torque applied to the driven or front wheels 10 and 20 for the purpose of canceling the change in acceleration or deceleration caused by the driving torque is Tt0×Wwf/Wwr.

In this manner, the target driving force and the target braking force can be set in such a manner that road surface $\mu$ estimation does not cause undesired acceleration or deceleration of vehicle 101. Even when vehicle 101 is traveling in a steady state, an annoyance to the driver due to the road surface $\mu$ estimation can be prevented or suppressed.

Also, when there is a request for generation of a braking or driving force from the driver, the target driving force and the target braking force can be calculated by adding the requested value in accordance with Equations 1, 2a and 2b to the pre-selected torque Tt0. In other words, the estimation control can handle not only situations where the vehicle 101 is traveling in a steady state, but also situations where the driver operates the accelerator or brake and thereby generates a driving force and braking force. That is, the amount of acceleration or deceleration generated by the operation will not be affected by the road surface $\mu$ estimation. Therefore, acceleration or deceleration that the driver intended can still be realized. In other words, the road surface friction coefficient estimation can be performed while the driver performs the acceleration and/or deceleration operation, as well as while vehicle 101 is in a steady traveling state.

When an obstacle avoidance control, which is shown in FIG. 13, is performed after the road surface $\mu$ estimation, which takes place every predetermined period of time Tc, the target driving torque value Ttsi and the target braking torque value Thsi, as well as the pre-selected torque Tt0 and the counter braking torque Tt0×Wwf/Wwr are used in the computations of a target control pressure Pwsi and a target drive torque Tes in steps S302 and S303 of the obstacle avoidance control. On the other hand, when the obstacle avoidance control takes place while the road surface $\mu$ estimation is in progress, a driving signal is outputted in step S304, such that the driving signal is to be outputted together with driving and braking forces generated for the road surface $\mu$ estimation.

The following relationships hold regarding Tt0×Wwf/Wwr in the aforementioned Equations 1, 2a and 2b. When the wheel loads on the front and rear wheels 10, 20, 30, and 40 are the same, i.e., Wwf=Wwr, then Tt0×Wwf/Wwr=Tt0. Tt0×Wwf/Wwr>Tt0 when Wwf>Wwr. Tt0×Wwf/Wwr<Tt0 when Wwf<Wwr. Therefore, the magnitudes of target values Thsi and Ttsi are determined according to which of the wheel loads Wwf and Wwr is greater. Similarly, the driving and braking torques for estimating the road surface $\mu$, as well as the driving and braking forces that are actually generated in wheels 10, 20, 30 and 40 for the purpose of road surface $\mu$ estimation are distributed among wheels 10, 20, 30 and 40 according to this relationship between the wheel loads Wwf and Wwr.

Since calculation of Wwf and Wwr is conducted in step S107, the wheel loads Wwf and Wwr have not been calculated at step S103 as far as this cycle of the road surface $\mu$ estimation is concerned. Therefore, the values of the wheel loads Wwf and Wwr calculated in the previous cycle of the road surface $\mu$ estimation are utilized for the purpose of calculation in step S103. Similarly, if the target braking torque Thsi is calculated, the wheel loads Wwf and Wwr that are calculated immediately prior to the current cycle of road surface $\mu$ estimation control or calculated in the previous cycle while the road surface $\mu$ estimation control is in progress are utilized for the purpose of calculation in step S103 in the current cycle. Further, where the driving and braking forces are generated for the purpose of estimating the road surface $\mu$, the driving and braking forces are distributed among the wheels 10, 20, 30 and 40 in such a manner that the lateral motion and rotational motion of the vehicle 101 are not affected.

Furthermore, this road surface $\mu$ estimation can take into account the response performance of brake fluid pressure controller 5 and driving torque controller 9 for engine control and transmission control. The brake fluid pressure controller 5 includes the actuator of the hydraulic pressure supply system on the front wheel side. In this case, the target braking and driving forces are set in a manner that takes into account the response characteristics exhibited by brake fluid pressure controller 5 and driving torque controller 9 when braking force and driving force are actually generated.

The road surface $\mu$ estimation according to the present invention which takes place every predetermined period of time Tc and lasts for a predetermined period of time is executed while the driving and braking forces for the purpose of the road surface $\mu$ estimation are being generated. The rest of the road surface $\mu$ estimation takes place according to the following processes.

Calculate Real Driving Torque Ttr

In step S104, real driving torque Ttri (where i is any whole number from 1 to 4) is calculated. In this embodiment, a signal indicative of driving torque Twi of each wheel axle is transmitted from driving torque controller 9, from which the real driving torque Ttri is obtained. Hence, following Equation 3 is satisfied:

$$Ttri=Twi \quad (3)$$

Here, driving torque controller 9 obtains driving torque Twi in the following manner. Driving torque controller 9 first obtains the engine speed Ne and throttle position TVO. Based on a map of the engine performance characteristics shown in FIG. 5, driving torque controller 9 obtains an engine output torque Te from the engine speed Ne and throttle position TVO. The driving torque Twi is then obtained using the engine output torque Te and the gear ratio $\lambda$, which is calculated based on the gear position signal from transmission 8. In this embodiment, vehicle 101 has a conventional differential gear device. Therefore, the real driving torque Ttri is given by the following Equations 4:

$$\text{Rear wheels: } Ttri=Twi=Te \times \lambda/2 \quad (4a)$$

$$\text{Front wheels: } Ttri=Twi=0 \quad (4b).$$

Here, the driving torque Ttri is transmitted via a differential gear device to the rear driving wheels 30 and 40. Since vehicle 101 uses the conventional differential gear device in this embodiment, the driving torque Ttri is distributed equally to left and right rear wheels 30 and 40. Therefore, the real driving torque Ttri on each of left and right rear wheels 30 and 40 is given by Equation 4a. Meanwhile, since the two front wheels 10 and 20 are the non-driving wheels to which torque is not transmitted, the real driving torque Ttri on each of left and right front wheels 10 and 20 is zero, as shown in Equation 4b.

Calculate Real Braking Torque Thr

Step S105 calculates the real braking torque Thri (where i is any whole number from 1 to 4). In this embodiment, brake fluid pressure controller 5 uses a proportional solenoid valve. Therefore, a command current Isi supplied to the proportional solenoid valve uniquely corresponds to the control hydraulic pressure Pwi, as indicated in the characteristic map shown in FIG. 6. Therefore, the real braking torque Thri can be obtained by the following Equation 5:

$$Tbri=ki \times Pwi=ki(Isi+\alpha) \quad (5)$$

where ki is a constant determined by factors relating to the brake and $\alpha$ is an offset current.

Calculate Wheel Acceleration Vwdi

Step S106 calculates the wheel acceleration Vwdi (where i is any whole number from 1 to 4) of wheels 10, 20, 30 and 40 based on the wheel velocity Vwi. In this embodiment, the wheel acceleration Vwdi can be obtained by the following Equation 6:

$$Vwdi=[(Vwi_1+Vwi_0)-(Vwi_4+Vwi_3)]/2\Delta T \quad (6)$$

where the subscripts 0 to 4 indicate the number of control cycles preceding the current control cycle. For instance, $Vwi_1$ is the wheel velocity of wheel i during the cycle immediately preceding the current cycle, whereas $Vwi_2$ is the wheel velocity of wheel i two cycles ago. $Vwi_0$ is the wheel velocity of wheel i in the current cycle. $\Delta T$ is the duration of the control cycle.

During execution of the road surface $\mu$ estimation, which is basically started every predetermined period of time Tc, the above calculation is executed while the driving force and braking force for estimating the road surface $\mu$ are being generated. Accordingly, the results of the calculation are used in the calculation of driving/braking force Fi of each wheel in step S108.

Calculate Wheel Load Wwi

Step S106 calculates the wheel load Wwi of each wheel. Wheel load Wwi is the weight of load exerted on each wheel, which includes the static wheel load and shifted load of vehicle 101. In this embodiment, wheel loads Wwfr (front right), Wwfl (front left), Wwrr (rear right), and Wwrl (rear left), are calculated according to Equations 7, based on longitudinal and lateral accelerations detected by longitudinal and lateral G-sensor 53. The longitudinal and lateral G values are passed through a primary delay filter before being used in Equations 7:

$$Wwfr=Wwfr0+kx \times Xg+kyf \times Yg \quad (7a)$$

$$Wwfl=Wwfl0+kx \times Xg-kyf \times Y \quad (7b)$$

$$Wwrr=Wwrr0-kx \times Xg+kyr \times Yg \quad (7c)$$

$$Wwrl=Wwrl0-kx \times Xg+kyr \times Y \quad (7d)$$

where constants kx, kyf, and kyr are determined based on the wheelbase, the height of the center of gravity, the treads, and the rolling stiffness distribution of vehicle 101. Meanwhile, the wheel loads Wwfr0, Wwfl0, Wwrr0, and Wwrl0 are the initial loads (static loads).

As seen in Equations 7a–7d, the wheel load Wwi on each wheel can be obtained by adding or subtracting the shifted load to or from the static wheel load. The shifted load is calculated based on the detected longitudinal acceleration value Xg and the detected lateral acceleration value Yg of the vehicle body. In this manner, the wheel loads Wwi can be obtained easily, accurately, and cost-efficiently.

Alternatively, wheel loads Wwi can be obtained by using sensors that detect the wheel loads based on suspension stroke amount.

When the calculation of wheel loads Wwi is conducted during execution of the road surface $\mu$ estimation control that takes place every predetermined period of time Tc, the above-mentioned calculations are executed while the driving force and braking force for estimating the road surface $\mu$ are being generated. The results of the calculations are used in the calculation of driving/braking force per unit wheel load Fwi in step S109.

Calculate Driving/Braking Force $\mu$ of Each Wheel

Step S108 calculates driving/braking force Fi of each wheel (where i is any whole number from 1 to 4). In this embodiment, the driving/braking force Fi is calculated according to Equation 8 shown below. Equation 8 is basically a motion equation for rotation of a wheel, which uses the real driving torque Ttri, real braking torque Thri, and wheel acceleration Vwdi calculated in steps S104 to S106:

$$Fi=[Ti-Ii \times Vwdi]/R \qquad (8)$$

where Ti is determined by Ti=Ttri−Thri, Ii is the rotational inertia of the tire, and R is the effective radius of the tire. In other words, Ti is the difference between the real braking torque Thri and the real driving torque Ttri. As mentioned earlier, the effective tire radius is the same for all rear and front wheels 10, 20, 30 and 40. In this calculation, a primary delay filter can also be used for noise removal.

During execution of the road surface $\mu$ estimation that is executed every predetermined period of time Tc, the above calculations are executed while the driving force and braking force for estimating the road surface $\mu$ are being generated. In such case, the results of the calculations are used in the calculation of the driving/braking force per unit wheel load Fwi in step S109.

Calculate Driving Force Per Unit Wheel Load Fwi

Figure 7:
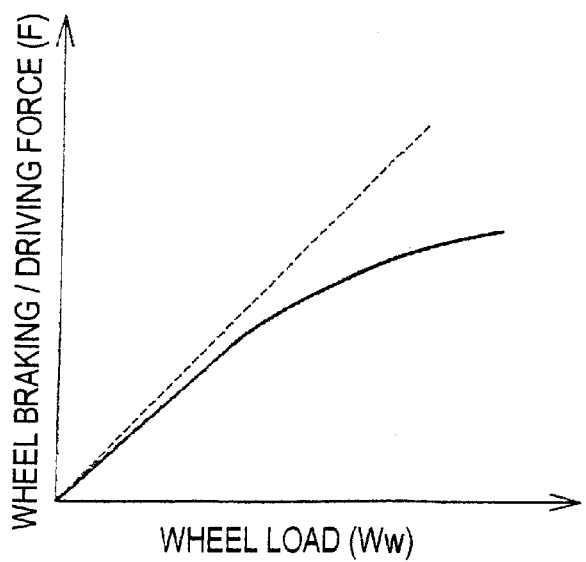
FIG. 7 is a graph illustrating the relationship between the wheel load W and the wheel driving/braking force F for use in the selected embodiments of the present invention.

Step 109 calculates the driving force per unit wheel load Fwi (where i is any whole number from 1 to 4) of each wheel based on the wheel loads Wwi calculated in step S107 and the driving/braking force Fi calculated in step S108. In this embodiment, the driving force per unit wheel load Fwi is calculated according to the following equation 9:

$$Fwi=Fi/(Wwi \times fwi \times fsi) \qquad (9)$$

where fwi is a coefficient that compensates for the nonlinear portion of the driving/braking force Fi, relative to the wheel load Wwi shown in FIG. 7, and fsi is a coefficient that compensates for the nonlinear portion of the driving/braking force relative to the wheel slip rate S shown in FIG. 8.

As seen in FIGS. 7 and 8, the driving/braking force Fi and the wheel load Wwi, and the driving/braking force Fi and slip rate S are not in a strictly linear relationship. Therefore, the coefficients fwi and fsi are utilized to compensate for the nonlinear portion of the relationship. Although the actual wheel driving/braking force Fi is monotonically non-decreasing relative to the wheel load Wwi, the driving/braking force Fi is not proportional to the wheel load Wwi, as shown in the solid line in FIG. 7. Therefore, in calculation of the wheel driving/braking force Fi, it is necessary to compensate the difference between the actual wheel driving/braking force Fi shown in solid line in FIG. 7 and the theoretical wheel driving/braking force under the assumption that the driving/braking force and the wheel load are in perfectly linear relationship, as shown in the broken line in FIG. 7.

Further, with regard to the relationship between the wheel slip rate Si and the wheel driving/braking force Fi, the wheel driving/braking force Fi is monotonically non-decreasing relative to the slip rate Si, as shown in FIG. 8. However, the wheel driving/braking force Fi and the wheel slip rate Si are not necessarily proportional to each other. Therefore, in the calculation of the wheel driving/braking force Fi, it is necessary to compensate as a non-linear portion the difference between the actual wheel driving/braking force Fi and the theoretical wheel driving/braking force under the assumption that the wheel driving/braking force and the slip rate are in a perfect linear relationship.

Figure 9:
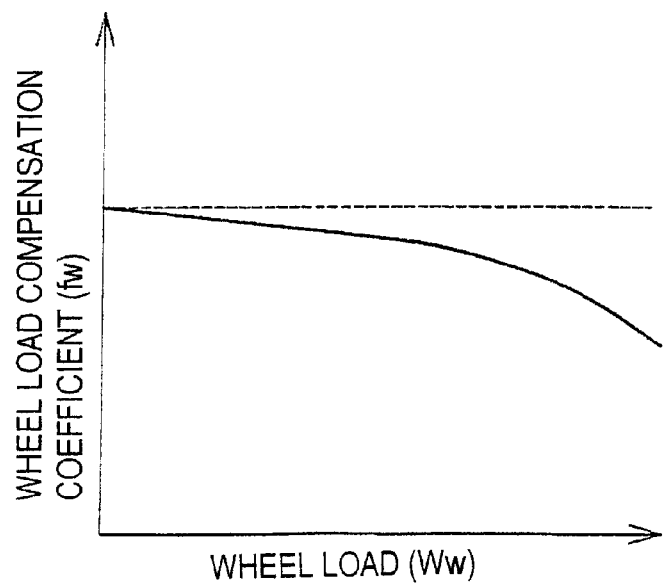
FIG. 9 is a graph illustrating the wheel load compensation coefficient fw used to compensate for the nonlinearity between the wheel load W and the wheel driving/braking force F for use in the selected embodiments of the present invention.
Figure 10:
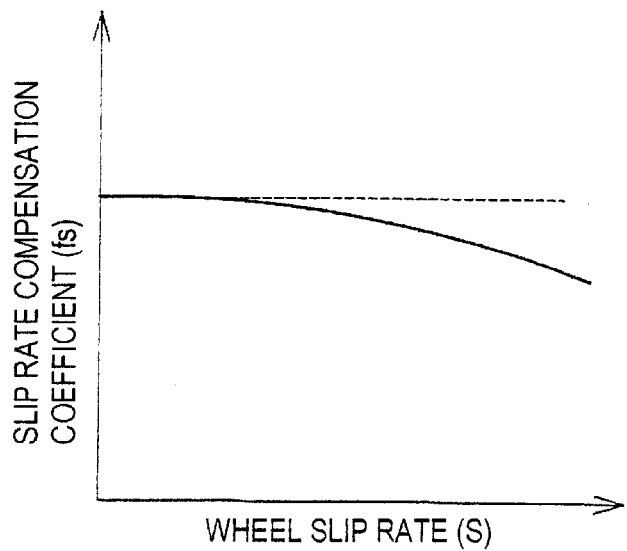
FIG. 10 is a graph illustrating the slip rate compensation coefficient fs used to compensate for the nonlinearity between the wheel slip rate S and the wheel driving/braking force F for use in the selected embodiments of the present invention.

In order to make such compensations, the compensation coefficients fwi and fsi are obtained from the graphs shown in FIGS. 9 and 10. Further, the driving/braking force per unit wheel load Fwi is calculated in step S109, using the wheel load Wwi obtained in step S107 based on Equations 7a–7d. In this embodiment, the wheel slip rate Si is calculated in step S111, which takes place after the step S109. Therefore, the slip rate Si in step S109 is a slip rate Si calculated in step S111 of the previous cycle of the road surface $\mu$ estimation.

Figure 11:
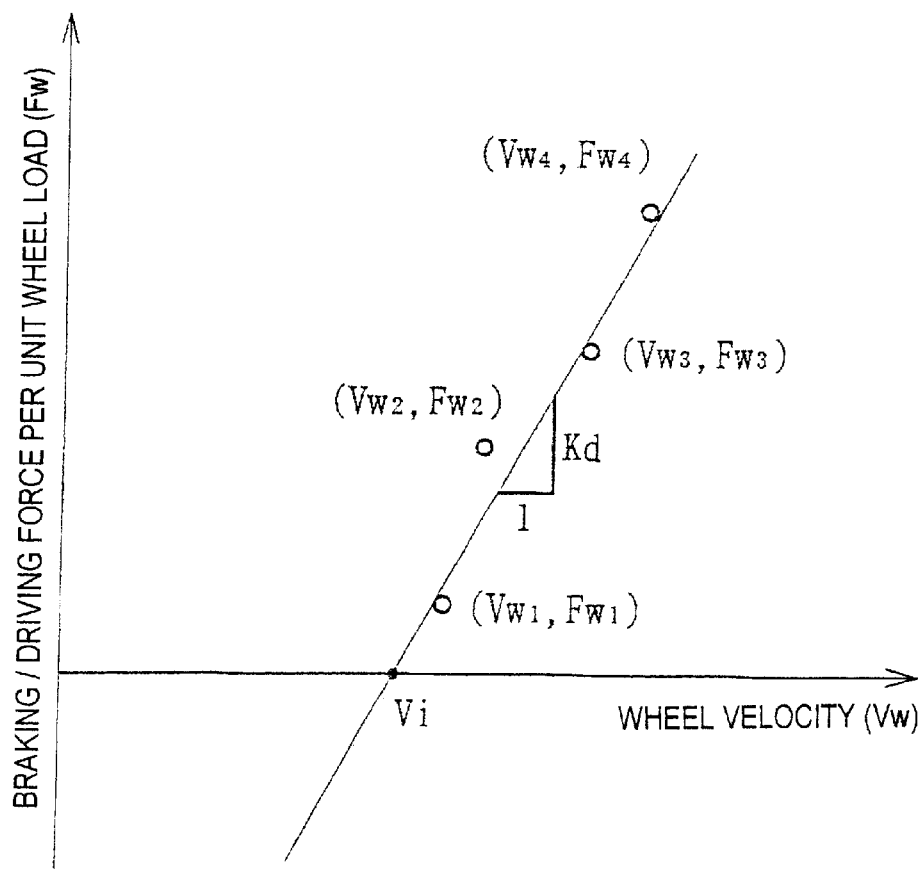
FIG. 11 is a graph with a plot of points on a two-dimensional coordinates having the wheel velocity axis and the driving/braking force per unit wheel load axis, each point representing each wheel for use in the selected embodiments of the present invention.

Calculate Vehicle Body Velocity Vi and Driving Stiffness Kd:

Step S110 calculates the vehicle body velocity Vi and the driving stiffness Kd according to the processes shown in FIG. 11.

In step S200, as shown in FIG. 11, the wheel velocity Vwi and the driving/braking force per unit wheel load Fwi of each wheel obtained in the previous step S109 are plotted as points (Vw1, Fw1), (Vw2, Fw2), (Vw3, Fw3) and (Vw4, Fw4) on a two-dimensional coordinates having a wheel velocity axis and a driving/braking force per unit wheel load axis. Then, in step S201, a single regression line representing these points is identified on the two-dimensional coordinates, such that the regression line represents at least two of the points. Although the regression line is a straight line in FIG. 11, the regression line can have a curve representing the points plotted on the two-dimensional coordinates. In step S202, the vehicle body velocity Vi is obtained. The vehicle body velocity Vi is the wheel velocity at the point where the regression line intersects the wheel velocity axis (horizontal axis). In step S203, the driving stiffness Kd is obtained. The driving stiffness Kd is the slope angle of the regression line with respect to the wheel velocity axis. The driving stiffness Kd is later used to estimate the road surface $\mu$. in step S112. The vehicle body velocity Vi and the driving stiffness Kd are thus calculated based on these elements on the plot.

In this embodiment, the commonly-known least squares method is used to find the vehicle body velocity Vi and the driving stiffness Kd. When the least squares method is used, the vehicle body velocity Vi and the driving stiffness Kd are expressed according to the following Equations 10 and 11:

$$Kd=[n\Sigma(Vwi \times Fwi)-\Sigma Vwi \times \Sigma Fwi]/[n\Sigma(Vwi)^2-(\Sigma Vwi)^2] \qquad (10)$$

$$Vi=[\Sigma Vwi \times \Sigma(Vwi \times Fwi)-\Sigma(Vwi)^2 \times \Sigma Fwi]/[n\Sigma(Vwi \times Fwi)-\Sigma Vwi \times \Sigma Fwi] \qquad (11).$$

Also, when a wheel is experiencing a large amount of slip, the slip will cause errors with respect to the calculation of the regression line. Therefore, when the slip rate Si of a wheel equals or exceeds a predetermined value $S_0$, the Vwi and Fwi data for that wheel are disregarded, such that the Vwi and Fwi data of the wheel are not used in the regression line calculation. Since slip rate Si has not been calculated in this cycle, the value of Si calculated in the previous cycle is utilized in this step.

Calculate Slip Rate of Si of Each Wheel

Step S111 calculates the slip rate Si of each wheel 10, 20, 30 and 40. In this embodiment, the slip rate Si is calculated using the following Equation 12, based on the wheel velocity Vwi of each wheel and the vehicle body velocity Vi, which is calculated in step S110:

$$Si=(Vi-Vwi)/Vi \qquad (12).$$

Therefore, wheel velocity sensors 13, 23, 33 and 43 and driving/braking force controller 50 function as slip rate detecting means, which produces a slip rate signal indicative of a slip rate for each of wheels 10, 20, 30 and 40.

Estimate Maximum Road Surface $\mu_{max}$

Step S112 estimates the road surface $\mu$ based on the driving stiffness Kd obtained in step S10. In this example, the maximum road surface $\mu$, i.e., $\mu_{max}$, is obtained by the graph of the relationship between the driving stiffness Kd and the maximum road surface friction coefficient ($\mu_{max}$) shown in FIG. 12.

The road surface $\mu$ estimation is executed in this manner. In this embodiment, the calculation method disclosed in Japanese Laid-Open Patent Publication H10-35443 is utilized. Alternatively, other method of estimating road surface friction coefficient based on driving/braking forces, wheel velocity, wheel load, such as one disclosed in Japanese Laid-Open Patent Publication 11-48939 can be utilized as a calculation method. However, the road surface $\mu$ estimation of the present invention is different from those disclosed in the above-mentioned disclosures in that the calculation in this invention takes place while the driving force and braking force are being generated at the same time.

The estimated road surface $\mu$ is stored in a memory circuit of driving/braking force controller 50, which also stores the calculation results. The stored value is thereafter updated with a new estimated road surface $\mu$.

In this manner, the road surface friction coefficient estimation apparatus 100 of the present invention can estimate the friction coefficient of the road surface on which a vehicle is traveling even when the vehicle is traveling in a steady state. On the other hand, conventional traction control systems and anti skid control systems can estimate the friction coefficient accurately only while the traction control or the anti skid control is in operation, in other words, only while acceleration of deceleration is exerted on the vehicle. Further, the road surface friction coefficient estimation apparatus 100 of the present invention does not cause any awkwardness from the acceleration or deceleration generated for the purpose of road surface friction coefficient estimation. Still further, with the road surface friction coefficient estimation apparatus 100 of the present invention, there is no need to utilize a new sensor such as one in the shape of a small wheel. Accordingly, there is no issue of price increase or a need to determine where to install the new sensor.

This road surface friction coefficient estimation apparatus 100 is useful for use in conjunction with various kinds of vehicle control, whose control performance is improved by accurate estimation of the road surface friction coefficient. Such vehicle control produces an acceleration/deceleration signal indicative of either acceleration or deceleration such that the driving torque controller 9 and/or brake fluid pressure controller 5 generates a driving and/or braking force in accordance with the acceleration/deceleration signal. As an example of the vehicle control, an obstacle avoidance control that avoids obstacles by executing automatic braking is discussed below. Driving/braking force controller 50 functions as vehicle control means 50.

The estimated road surface $\mu$ is obtained by the road surface $\mu$, estimation that takes place every predetermined period of time Tc and lasts for a predetermined duration of time. The road surface $\mu$ thus obtained is utilized in following vehicle control processes. In this embodiment, an obstacle avoidance control is performed in steps S300 to 304 of FIG. 13 as a vehicle control. In FIG. 13, step S300 determines whether obstacle avoidance control should be started. Step S301 calculates a target deceleration. Step S302 calculates a target braking hydraulic pressure. Step S303 calculates a target engine driving torque. Step S304 outputs a drive signal.

In this embodiment, the road surface $\mu$ utilized for the obstacle avoidance control is the road surface $\mu$ that has been obtained during the most recent estimation of the road surface $\mu$. More specifically, if the obstacle avoidance control is performed after the estimated $\mu_{max}$ is calculated, the estimated $\mu_{max}$ calculated in the most recent cycle is utilized. If the obstacle avoidance control is performed while the road surface $\mu$ estimation control is in progress, the estimated $\mu_{max}$ calculated during the immediately preceding cycle is utilized.

Determine Start of Obstacle Avoidance Control

Step S300 determines whether or not to start obstacle avoidance control based on the distance signal indicative of the distance Lx between vehicle 101 and an obstacle, and the same-lane determination signal Fc, which are obtained from millimetric wave controller 61 and single-lens camera controller 62, respectively. The distance signal and the same-lane determination signal Fc are both read each time step S100 is executed. The obstacle avoidance control is started also based on the vehicle body velocity Vi obtained in step S110.

In this embodiment, the start conditions for obstacle avoidance control are determined to be satisfied when the same-lane determination signal Fc is ON, i.e., when there is an obstacle in the same lane with vehicle 101. At the same time, the relationship between the vehicle body velocity Vi and distance Lx needs to satisfy the following Equation 13:

$$Lx<Vi^2/Ka+L_{offset} \qquad (13).$$

Here, Ka is a control variable obtained from the following Equation 14 using the maximum road surface $\mu$ ($\mu_{max}$), which has been obtained in step S112:

$$Ka=2\times\mu_{max} \qquad (14).$$

In Equation 13, $L_{offset}$ is a tuning parameter for performing a tuning with respect to the driver's comfort level. In this manner, the present invention can also provide the optimum tuning.

Calculate Target Deceleration Xgs

Step S301 calculates a target braking deceleration Xgs for obstacle avoidance control. In this embodiment, the target braking deceleration Xgs is calculated based on the following Equation 15:

$$Xgs = 0.8 \times \mu_{max} \quad (15).$$

When obstacle avoidance control is not in operation, the target braking deceleration Xgs is obtained based on the following Equation 16:

$$Xgs = \Sigma Fi/M \quad (16)$$

where M is a mass of vehicle 101.

Thus, by means of Equations 13, 14, and 15, the estimated road surface friction coefficient $\mu_{max}$ obtained in the aforementioned road surface $\mu$ estimation is appropriately utilized in the determination of whether or not to start the obstacle avoidance control. A braking deceleration control conducted during the obstacle avoidance control is also based on the estimated road surface friction coefficient $\mu_{max}$.

For the purpose of avoiding obstacles, it is preferable to activate the obstacle avoidance control as early as possible. As seen in Equation 13, tuning parameter $L_{offset}$ is making the value of distance Lx greater. Since the distance signal determines when the obstacle avoidance should be started, tuning parameter $L_{offset}$ is making the obstacle avoidance start earlier than otherwise. Accordingly, the comfort level of the driver is maintained. By controlling the target braking deceleration Xgs, the obstacle avoidance control can be started at an appropriate timing.

Assuming the vehicle body velocity Vi is constant, the following statements hold based on Equations 13–15. If the value of $\mu_{max}$ is relatively large, the distance Lx between vehicle 101 and the obstacle at which the obstacle avoidance is activated, is relatively small. Accordingly, the obstacle avoidance is started at a later time than otherwise. In this way, obstacle avoidance control can be executed appropriately while generating a deceleration force obtained from the Equation 15 that is large in accordance with the large $\mu_{max}$ value.

Meanwhile, if the value of $\mu_{max}$ is relatively small, in other words, if the road surface is relatively slippery, the obstacle avoidance control is started when the distance Lx between vehicle 101 and the obstacle is relatively great as seen in Equations 13 and 14. In this way, obstacle avoidance control can be executed appropriately while generating a deceleration force obtained from Equation 15 that is small in accordance with the small $\mu_{max}$ value.

Calculating Target Braking Hydraulic Pressure Pswi and Target Driving Torque Tes In this embodiment, steps S302 and S303 calculate the target braking hydraulic pressure Pswi and the target driving torque Tes, respectively.

Step S302 calculates the target braking hydraulic pressure Pwsi. In this embodiment, calculation of the target braking hydraulic pressure Pwsi changes depending on whether or not the collision avoidance control is already exerting a braking force.

(a) When obstacle avoidance control is not exerting a braking force, which is hereinafter referred to as a normal state, the target braking hydraulic pressure Pswi is calculated based on the following Equation 17, using the target braking torque Tbsi obtained in step S103:

$$Pwsi = Tbsi/ki \quad (17).$$

(b) When obstacle avoidance control is exerting a braking force, the target braking hydraulic pressure is calculated based on Equation 18, using the target braking deceleration Xgs which has been obtained by Equation 15:

$$Pwsi = M \times Xgs \times R/(4 \times ki) \quad (18).$$

Step 303 calculates the target engine driving torque Tes. In this embodiment, as in the target braking hydraulic pressure Pwsi, calculation of the target engine driving torque Tes changes depending on whether or not the obstacle avoidance control is exerting a braking force.

(a) When obstacle avoidance control is not exerting a braking force, in other words during the normal state, the target engine driving torque Tes is calculated based on Equation 19, using the target driving torque Ttsi which has been obtained in step S102:

$$Tes = Ttsrr + Ttsrl = Ttsr \times 2 \quad (19)$$

where Ttsr=Ttsrr=Ttsrl.

(b) When the obstacle avoidance control is exerting a braking force, a driving force is not generated. In other words, following Equation 20 is satisfied:

$$Tes = 0 \quad (20)$$

where a negative engine torque can be generated by engine braking.

Output Drive Signal

Each time step S304 is executed, driving/braking force controller 50 sends to brake fluid pressure controller 5 and driving torque controller 9 a drive signal which is based on the target braking force hydraulic pressure Pwsi and target engine driving torque Tes.

As described above, where the obstacle avoidance control is already exerting a braking force, the aforementioned $\mu_{max}$ is appropriately utilized in the determination of whether or not to start obstacle avoidance control, as seen in Equations 13, 14, 15, 18 and 20. The $\mu_{max}$ is also utilized appropriately in the braking deceleration control of obstacle avoidance control as seen in Equations 15 and 18. Thus, the automatic braking for the obstacle avoidance control can be executed at an optimum timing with the target braking deceleration Xgs. Such vehicle control system that uses automatic braking to avoid obstacle has the following advantages.

First of all, as discussed above, road surface friction coefficient estimation using the generation of a braking force and a driving force can basically be conducted with strict adherence to a fixed time cycle Tc, even when the vehicle 101 is traveling in a steady state.

Therefore, the road surface $\mu$ of the road on which vehicle 101 is currently traveling can be estimated periodically. Accordingly, recent road surface $\mu$ estimate value $\mu_{max}$ can be obtained periodically. As a result, most recent $\mu_{max}$ can be used in the aforementioned obstacle avoidance control, such that most recent state of vehicle 101 is reflected in the relevant vehicle control. For example, even in a situation where vehicle 101 is traveling in a steady state, if it is indicated that obstacle avoidance control is necessary to avoid an obstacle, automatic braking can be performed with a desired braking force by using the estimated value of the road surface $\mu$, which has just been obtained during the current cycle Tc or the cycle immediately preceding the current cycle. In this manner, it is possible to avoid obstacles by generating a desired braking force. This arrangement is quite advantageous in comparison with a road surface estimation performed by a traction control system or an antiskid system, because the traction control system cannot conduct the estimation unless traction control is actually in operation, and the anti-skid system cannot conduct the estimation unless the brakes are actually being applied and a braking force is being generated on the wheels.

In this respect, an estimation apparatus 100 in accordance with the present invention is very effective for use in a vehicle control that avoids obstacles by means of automatic braking.

Second Embodiment

The second embodiment of the present invention is an expansion and improvement over the first embodiment. More specifically, the second embodiment is similar to the first embodiment except that the target driving/braking force setting means or driving/braking force controller 50 in FIG. 2 and step S103 in FIG. 3 are modified. In view of the similarity between the first and second embodiments, the components or steps having the same function are given the identical reference numerals. Moreover, explanation of components and operations that function in a similar manner as in the first embodiment will be omitted. Only the components or steps that are different in function will be explained herein.

Figure 14:
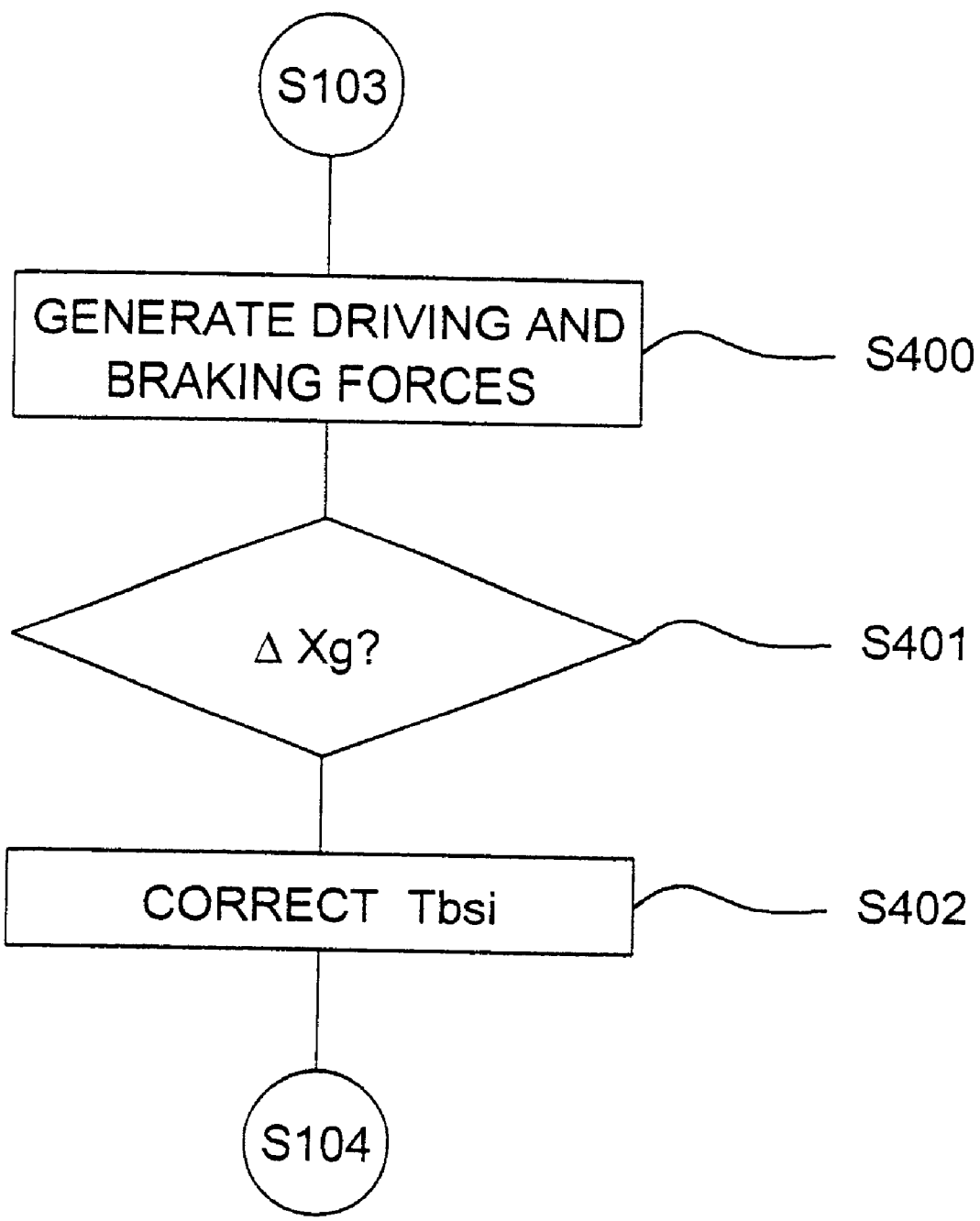
FIG. 14 is a partial flowchart of the road surface friction coefficient estimation in accordance with the second embodiment of the present invention.

Referring to FIG. 14, in the second embodiment, the target braking force Tbsi is further corrected based on a reference value. In step 400, driving and braking forces are generated. When it is determined in step S401 that longitudinal acceleration changed as a result of generating the driving and braking forces, the target braking force Tbsi is corrected in step S402 in accordance with the magnitude of the change in longitudinal acceleration or the difference between the current and target longitudinal accelerations. This correction is intended to further suppress changes in longitudinal acceleration during road surface $\mu$ estimation.

Also, in the first embodiment, the target braking torque Tbsi is calculated in steps S102 and S103 shown in FIG. 3, according to the aforementioned Equation 2a, such that the change in vehicle acceleration resulting from pre-selected torque Tt0 can be suppressed:

$$\text{Front wheel: } Tbsi = Tbbsi + Tt0 \times Wwf/Wwr \quad (2a).$$

In the second embodiment, the target braking torque Tbsi is not calculated solely on a feed-forward basis. Rather, in step S402, the target braking torque Tbsi is also corrected based on the following Equation 21, using the value $\Delta Xg$, which is the difference between longitudinal acceleration sensor value Xg and target longitudinal acceleration Xgs:

$$\text{Front wheel: } Tbsi = Tbbsi + Tt0 \times Wwf/Wwr - kg \times \Delta Xg \quad (21)$$

where $\Delta Xg$ is the difference Xgs−Xg, and kg is the feedback gain.

Thus, by correcting the target braking torque Tbsi in accordance with the Equation 21, the change in longitudinal acceleration that occurs during road surface $\mu$ estimation can be further suppressed.

In addition to the operational effects obtained from first embodiment, the second embodiment further makes it possible to correct the value of the counter braking force. Thus, more precise control operations can be accomplished.

As discussed earlier, during execution of the road surface $\mu$ estimation in which a driving force and a counter braking force are generated, the counter braking force corresponding to the driving force is generated in order to prevent the change in vehicle acceleration that would otherwise result from the generated driving force. In the first embodiment, this counter braking force is generated in a feed-forward manner using Equation 2a. The second embodiment is even more effective because it suppresses the change in the longitudinal acceleration that occurs during execution of the road surface $\mu$ estimation. When the longitudinal acceleration changes as a result of the generation of the driving/braking forces, the target braking force can be corrected based on the deviation $\Delta Xg$ with respect to the target longitudinal acceleration. As a result, the change in longitudinal acceleration during the execution of road surface $\mu$ estimation can be suppressed more effectively.

In addition to the feedback method of Equation 21, there are other ways to accomplish the correction of longitudinal acceleration. For example, where the longitudinal acceleration changes, a further correction based on the amount of the change can be executed so as to suppress the change in longitudinal acceleration.

In this manner, the road surface friction coefficient estimating apparatus of the present invention is well suited for use in a vehicle control system that avoids an obstacle by means of automatic braking. Further, the road surface friction coefficient estimating apparatus can estimate the friction coefficient of the road surface on which a vehicle 101 is traveling, even when the vehicle 101 is traveling in a steady state. Therefore, the present invention provides an apparatus that is extremely useful for various forms of vehicle control whose control performance is improved by an accurate estimation of the road surface friction coefficient.

The present invention is not limited to the embodiments described heretofore. For example, although the aforementioned embodiments are applied to a rear-wheel drive vehicle having an automatic transmission with conventional differential gear device, the application of the present invention is not limited to such vehicles.

Also, the embodiments described above utilize control apparatuses in which left and right braking forces can be controlled independently by braking hydraulic pressure for both the front and rear wheels. However, the application of the present invention is not limited to such control apparatuses.

The terms of degree such as "substantially", "about " and "approximately " as used herein mean a reasonable amount of deviation of the modified term such that the end result is not significantly changed. These terms should be construed as including a deviation of ±5% of the modified term if this would not negate the meaning of the word it modifies.

This application claims priority to Japanese patent Application No. H11-357457. The entire disclosure of Japanese Patent Application No. H11-357457 is hereby incorporated herein by reference While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A road surface friction coefficient estimating apparatus for a vehicle equipped with a plurality of wheels, comprising:

a driving force controller that is operatively coupled to the wheels to generate a driving force in at least one of the wheels in accordance with a pre-selected force;

a braking force controller that is operatively coupled to the wheels to generate a braking force in at least one of other wheels in accordance with the pre-selected force, the braking force having a magnitude to cancel the driving force;

a wheel velocity sensor that produces a wheel velocity signal indicative of a wheel velocity;

a wheel load sensor that produces a wheel load signal indicative of a wheel load; and a control unit operatively coupled to said driving force controller, said braking force controller, said wheel velocity sensor and said wheel load sensor, said control unit being configured to set the pre-selected force to be generated, obtain the wheel load signal of each wheel from said wheel load sensor, obtain the wheel velocity signal of each wheel from said wheel velocity sensor, and calculate a road surface friction coefficient based on the wheel load, the wheel velocity, and the braking and driving forces.

2. A road surface friction coefficient estimating apparatus as set forth in claim 1, wherein said driving force controller generates the driving force by controlling an engine output and a gear ratio of a transmission to apply a desired driving torque on the wheels.

3. A road surface friction coefficient estimating apparatus as set forth in claim 1, wherein said braking force controller generates the braking force by controlling a brake unit to apply a desired braking torque on the wheels.

4. A road surface friction coefficient estimating apparatus as set forth in claim 1, wherein said control unit is further configured to produce a lateral/longitudinal acceleration signal indicative of a lateral/longitudinal acceleration, said control unit obtains the wheel load by adding or subtracting a load shift quantity to or from a static wheel load, and the load shift quantity is calculated based on the lateral/longitudinal acceleration signal.

5. A road surface friction coefficient estimating apparatus as set forth in claim 1, wherein said control unit is further configured to plot points on a two-dimensional coordinates having a wheel velocity axis and a driving/braking force per unit wheel load axis, each point representing the wheel velocity and the driving/braking force per unit wheel load of a wheel, identify a regression line from the points, said regression line representing at least two of the points, and estimate the vehicle velocity based on the value of the wheel velocity where said regression line intersects said wheel velocity axis of said two dimensional coordinates, and the road surface friction coefficient based on a slope angle of said regression line with respect to said wheel velocity axis.

6. A road surface friction coefficient estimating apparatus as set forth in claim 5, wherein said control unit is configured to estimate the road surface friction coefficient based on a relationship between a maximum road surface friction coefficient and said slope angle of said regression line with respect to said wheel velocity axis.

7. A road surface friction coefficient estimating apparatus as set forth in claim 1, wherein said control unit is configured to set the pre-selected force every predetermined period of time.

8. A road surface friction coefficient estimating apparatus as set forth in claim 7, wherein said control unit is configured to set the pre-selected force when a driver operates the vehicle to generate more than a predetermined amount of one of the braking and driving forces, regardless of the predetermined period of time.

9. A road surface friction coefficient estimating apparatus as set forth in claim 1, wherein, said driving force controller and said braking force controller distribute the braking and driving forces among the wheels such that lateral and rotational motions of the vehicle are not affected.

10. A road surface friction coefficient estimating apparatus as set forth in claim 1, wherein said control unit further calculates a target driving force and a target braking force by adding the pre-selected force to an operative driving force and an operative braking force generated by operations by the driver, said driving force controller generates a driving force in at least one of the wheels in accordance with the target driving force set by said control unit, and said braking force controller generates a braking force in at least one of the wheels in accordance with the target braking force set by said control unit.

11. A road surface friction coefficient estimating apparatus as set forth in claim 10, wherein said control unit is configured to detect a response characteristics that said driving force controller and said braking force controller exhibit when said driving force controller and said braking force controller generate the driving force and the braking force, and said control unit is configured to set the target braking and driving forces taking into account the response characteristics.

12. A road surface friction coefficient estimating apparatus as set forth in claim 10, wherein said control unit is further configured to detect a longitudinal acceleration of the vehicle, and use the braking force as a target braking force reference value having the same magnitude as the driving force and correct said target braking force reference value when the longitudinal acceleration changes as a result of generating the braking and driving forces, said correction being in accordance with one of the amount of change in the longitudinal acceleration and a deviation from a target longitudinal acceleration.

13. A road surface friction coefficient estimating apparatus as set forth in claim 10, wherein said control unit determines a lateral acceleration/yaw rate, and said control unit sets the target driving force and the target braking force to zero when the lateral acceleration/yaw rate of the vehicle equals or exceeds a predetermined value.

14. A road surface friction coefficient estimating apparatus as set forth in claim 1, wherein said control unit is further configured to produce a slip rate signal indicative of a slip rate for each of the wheels, and said driving force controller and said braking force controller suspend generation of the driving force and the braking force when any one of the slip rates of the wheels equals or exceeds a predetermined value during generation of the driving and braking forces.

15. A road surface friction coefficient estimating apparatus as set forth in claim 1, wherein said control unit is further configured to produce an acceleration/deceleration signal indicative of one of acceleration and deceleration of the vehicle such that at least one of said driving force controller and said braking force controller generates one of a driving force and a braking force in accordance with the acceleration/deceleration signal.

16. A road surface friction coefficient estimating apparatus as set forth in claim 15, further comprising a radar device that produces a distance signal indicative of a distance between the vehicle and an obstacle; and a lane indicator that produces a same-lane determination signal indicative of whether the vehicle and the obstacle are in the same lane, wherein said control unit is operatively coupled to said radar device and said lane indicator, said control unit producing the acceleration/deceleration signal in accordance with the road surface friction coefficient, the distance signal, and the same-lane determination signal.

17. A road surface friction coefficient estimating apparatus for a vehicle equipped with a plurality of wheels, comprising:

target driving/braking force setting means for setting a pre-selected force to be generated;

driving force generating means for generating a driving force in at least one of the wheels in accordance with the pre-selected torque set by said target driving/braking force setting means;

braking force generating means for generating a braking force in at least one of other wheels in accordance with the pre-selected torque set by said target driving/braking force setting means, said braking force having a magnitude to cancel said driving force;

wheel velocity detecting means for producing a wheel velocity signal indicative of a wheel velocity;

wheel load detecting means for producing a wheel load signal indicative of a wheel load; and road surface friction coefficient calculating means for calculating a road surface friction coefficient based on the wheel load, the wheel velocity, and the braking and driving forces.

18. A road surface friction coefficient estimating apparatus as set forth in claim 17, wherein said target driving/braking force setting means further calculates a target driving force and a target braking force by adding the pre-selected force to an operative driving force and an operative braking force generated by operations by a driver, said driving force generating means generates the driving force in at least one of the wheels in accordance with the target driving force set by said target driving/braking force setting means, and said braking force generating means generates the braking force in at least one of the wheels in accordance with the target braking force set by said target driving/braking force setting means.

19. A road surface friction coefficient estimating apparatus as set forth in claim 17, further comprising vehicle control means for producing an acceleration/deceleration signal indicative of one of acceleration and deceleration of the vehicle such that at least one of said driving force generating means and said braking force generating means generates one of a driving force and a braking force in accordance with the acceleration/deceleration signal, said vehicle control means including distance detecting means for producing a distance signal indicative of a distance between the vehicle and an obstacle, same-lane determination means for producing a same-lane determination signal indicative of whether the vehicle and the obstacle are in the same lane, and acceleration/deceleration signal producing means for producing an acceleration/deceleration signal in accordance with the distance signal and the same-lane determination signal.

20. A method of estimating a road surface friction coefficient, for a vehicle equipped with a plurality of wheels, comprising:

obtaining a wheel load of each wheel;

setting a pre-selected force;

generating a driving force in at least one of the wheels based on the pre-selected force;

generating a braking force in at least one of the other wheels based on the pre-selected force, the braking force being having a magnitude to cancel the driving force;

detecting a wheel velocity of each wheel; and calculating a road surface friction coefficient based on the wheel load, the wheel velocity, the driving force acting on the at least one of the wheels, and the braking force acting on the at least one of the other wheels.

* * * * *